(12) United States Patent
Luo et al.

(10) Patent No.: US 10,953,483 B2
(45) Date of Patent: Mar. 23, 2021

(54) TOOL ELECTRODE FOR AND METHODS OF ELECTRICAL DISCHARGE MACHINING

(71) Applicant: General Electric Company, Schenectady, NY (US)

(72) Inventors: Yuefeng Luo, Liberty Township, OH (US); Nouman Usmani, Cincinnati, OH (US); Yuanfeng Luo, Rexford, NY (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 15/813,226

(22) Filed: Nov. 15, 2017

(65) Prior Publication Data

US 2019/0143431 A1    May 16, 2019

(51) Int. Cl.
| | |
|---|---|
| *B23H 1/06* | (2006.01) |
| *B23F 23/08* | (2006.01) |
| *B23H 7/26* | (2006.01) |
| *B23F 23/12* | (2006.01) |
| *B23H 1/02* | (2006.01) |
| *B23H 9/14* | (2006.01) |
| *B23H 9/10* | (2006.01) |
| *B23H 1/04* | (2006.01) |

(52) U.S. Cl.
CPC ............ *B23H 1/06* (2013.01); *B23F 23/085* (2013.01); *B23F 23/1212* (2013.01); *B23F 23/1293* (2013.01); *B23H 1/028* (2013.01); *B23H 7/26* (2013.01); *B23H 7/265* (2013.01); *B23H 9/10* (2013.01); *B23H 9/14* (2013.01); *B23H 1/04* (2013.01)

(58) Field of Classification Search
CPC ... B23H 1/06; B23H 1/04; B23H 1/08; B23H 1/028; B23H 7/20; B23H 7/26; B23H 7/265; B23H 7/30; B23H 9/10; B23H 9/14
See application file for complete search history.

(56) References Cited

U.S. PATENT DOCUMENTS

| | | |
|---|---|---|
| 679,105 A | 7/1901 | Buck |
| 3,740,519 A | 6/1973 | O'Connor |
| (Continued) | | |

FOREIGN PATENT DOCUMENTS

| | | |
|---|---|---|
| GB | 2222108 A | 2/1990 |
| JP | S60108213 A | 6/1985 |
| (Continued) | | |

*Primary Examiner* — J C Jacyna
(74) *Attorney, Agent, or Firm* — Dority & Manning, P.A.

(57) ABSTRACT

Tool electrodes for and methods of electrical discharge machining are provided. In one exemplary aspect, a tool electrode for machining features into a workpiece is provided that allows for increased machining speed without sacrificing the quality of the machined features. Moreover, a tool electrode is provided that eliminates or reduces the high cost associated with customized tool electrodes. In particular, a tool electrode is provided that includes a plurality of electrode elements arranged and spaced apart in a digitized matrix representative of a tooling shape for machining features into a workpiece. The plurality of electrode elements are spaced apart from one another and arranged in the digitized matrix by digitizing an analog electrode tool configured to machine the feature into the workpiece or a volume of the feature to be machined into the workpiece.

19 Claims, 11 Drawing Sheets

(56) References Cited

U.S. PATENT DOCUMENTS

| | | | |
|---|---|---|---|
| 4,101,405 A | 7/1978 | Inoue | |
| 4,146,770 A | 3/1979 | Dinsdale et al. | |
| 4,159,407 A * | 6/1979 | Wilkinson | B23H 1/00 |
| | | | 204/224 M |
| 4,476,369 A | 10/1984 | Inoue | |
| 4,596,066 A | 6/1986 | Inoue | |
| 4,767,903 A | 8/1988 | Sciaroni | |
| 4,814,573 A | 3/1989 | Check et al. | |
| 4,819,325 A | 4/1989 | Cross et al. | |
| 4,992,639 A | 2/1991 | Watkins et al. | |
| 5,177,336 A | 1/1993 | Duffin | |
| 5,605,639 A | 2/1997 | Banks et al. | |
| 5,618,450 A | 4/1997 | Stuart et al. | |
| 5,893,984 A * | 4/1999 | Thompson | B23H 9/10 |
| | | | 219/69.15 |
| 5,983,984 A | 11/1999 | Auderheide et al. | |
| 6,165,422 A * | 12/2000 | Baker | B23H 9/04 |
| | | | 422/186.04 |
| 6,403,910 B1 | 6/2002 | Stang et al. | |
| 6,624,377 B2 | 9/2003 | Gianchandani et al. | |
| 6,850,874 B1 * | 2/2005 | Higuerey | B23H 7/20 |
| | | | 703/4 |
| 7,041,933 B2 | 5/2006 | Forrester et al. | |
| 8,168,913 B2 | 5/2012 | Luo | |
| 9,126,278 B2 | 9/2015 | Vargas | |
| 9,364,910 B2 | 6/2016 | Okamoto et al. | |
| 9,416,462 B2 | 8/2016 | Zhan et al. | |
| 9,550,245 B2 | 1/2017 | Tamida et al. | |
| 2002/0179573 A1 * | 12/2002 | Gianchandani | B23H 1/00 |
| | | | 219/69.11 |
| 2004/0050821 A1 | 3/2004 | Krenz | |
| 2007/0264566 A1 | 11/2007 | Arndt et al. | |
| 2011/0186551 A1 | 8/2011 | Itoh et al. | |
| 2013/0248495 A1 * | 9/2013 | Leao | B23H 7/38 |
| | | | 219/69.17 |
| 2014/0131318 A1 | 5/2014 | Luo et al. | |
| 2015/0209884 A1 | 7/2015 | Hamada et al. | |
| 2015/0293521 A1 * | 10/2015 | Ozkeskin | B23H 9/00 |
| | | | 700/114 |
| 2017/0072487 A1 | 3/2017 | Luo et al. | |
| 2017/0072488 A1 * | 3/2017 | Luo | B23H 1/028 |
| 2018/0065200 A1 * | 3/2018 | Liu | B23H 1/024 |
| 2018/0111210 A1 * | 4/2018 | Yuan | B23H 7/22 |
| 2020/0030901 A1 * | 1/2020 | Nagase | B23H 7/265 |

FOREIGN PATENT DOCUMENTS

| | | |
|---|---|---|
| JP | H11170119 A | 6/1999 |
| JP | 2000354914 A | 12/2000 |

* cited by examiner

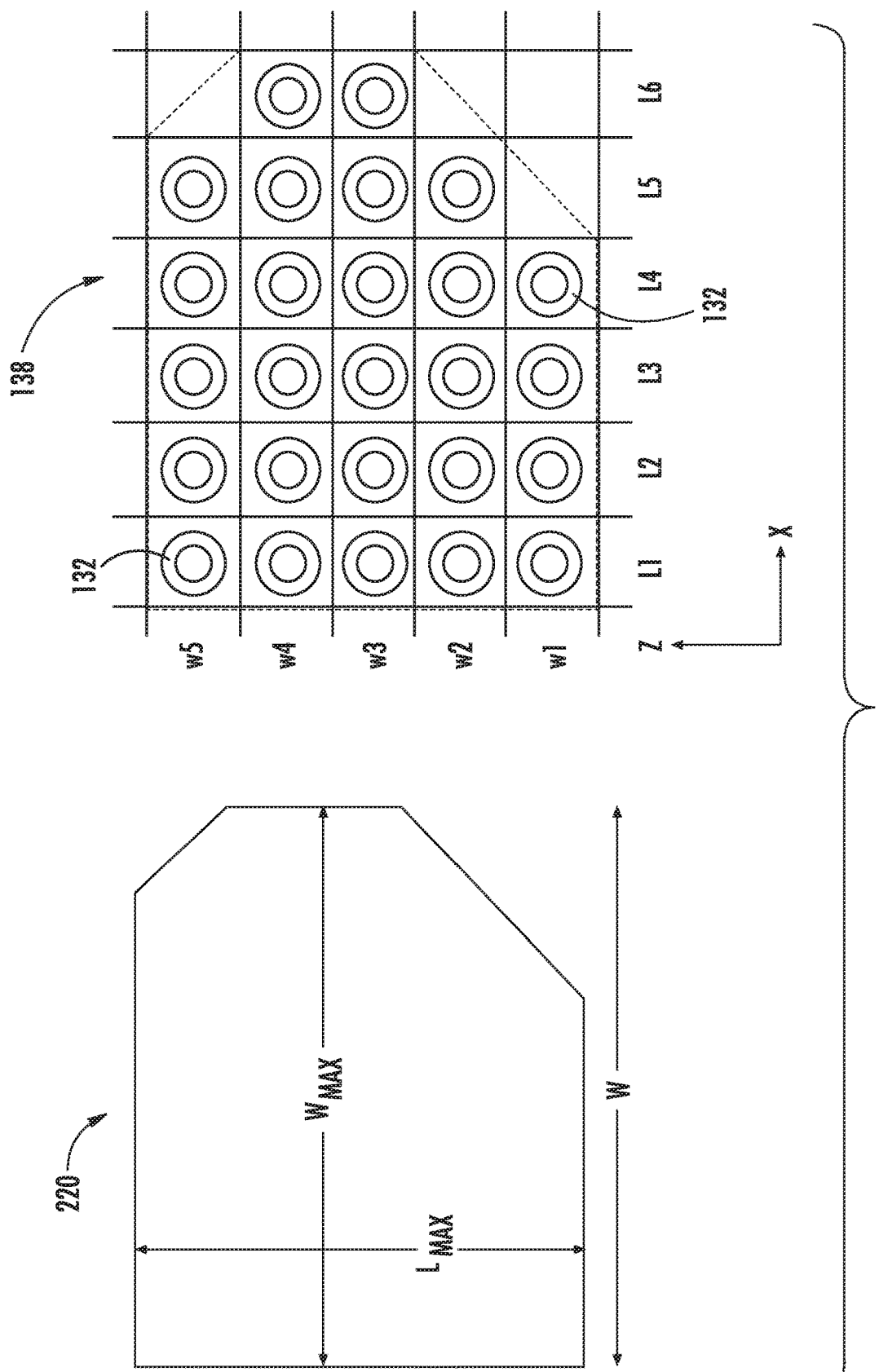

TOOL ELECTRODE FOR AND METHODS OF ELECTRICAL DISCHARGE MACHINING

FIELD

The present subject matter relates generally to electrodes for use in electric discharge machining (EDM) and particularly to EDM electrodes for machining ceramic matrix composite (CMC) components.

BACKGROUND

There is increased interest in forming gas turbine or jet engine components from composite materials, such as ceramic matrix composite (CMC) materials, that can withstand relatively extreme temperatures and pressures. Manufacturing components from CMC materials often presents a number of manufacturing challenges, including productivity, quality, and cost challenges.

For instance, some CMC components are formed of a SiC/SiC reinforcement/matrix material and thus typically require a diamond material to cut the CMC component to shape. As an example, an ultrasonic machining process using a diamond flow may be used to cut, e.g., seal slots in a CMC component. Although diamonds can adequately cut CMC components, the diamonds mix with the CMC fibers and matrix material such that the diamonds cannot be reused to machine further CMC components. Accordingly, such processes are expensive. Further, component seal slots typically have high aspect ratios that make machining such slots difficult. The edges and corner quality of such slots can have irregular shapes due to worn corners of the sonotrode of the ultrasonic tool. Other conventional cutting and grinding processes for seal slots are limited by tool deflection and speed as well as accessibility to tight corners and sides, while laser cutting processes are limited by the taper of the slot sides. Moreover, seal slots must have low surface roughness to ensure high sealing efficiency and structural stability. However, surface finishes of CMC components machined by ultrasonic machining processes can be relatively rough due to the coarse abrasive grit size of the diamond necessary for fast machining speed and depth, laser machining processes can generate thermal stresses and micro-cracks in CMC components, often with a slot taper that is beyond the required tolerance, and conventional grinding and machining processes typically cannot machine slot corners, much less smooth corners.

As a result, electric discharge machining (EDM) processes generally are the most appropriate processes for machining deeper features in CMC components, such as seal slots. More particularly, ram EDM is typically used for machining blind features in CMC components. Nonetheless, EDM processing of CMC components does face its own challenges. For example, EDM processing of a CMC component can be a relatively slow process compared to other processes, such as ultrasonic machining. For instance, machining seal slots in CMC components via EDM can have long cycle times due to flushing issues and dielectric flows more generally. That is, as the tool electrode advances toward a desired slot depth, dielectric flushing may become increasingly difficult and may stall, and the electrode may be damaged by arcing. Moreover, there is typically a quality penalty when high pulse energy is used to speed up the EDM process. Thus, conventionally, increased EDM speed has led to decreased part quality, such as e.g., increased surface roughness. Further, ram tool electrodes can be expensive to manufacture and utilize due to their custom designs, machining, dressing, etc., as well as associated maintenance and manufacturing set up.

Therefore, improved tool electrodes for EDM processes and improved EDM processes utilizing such electrodes that address one or more of the challenges noted above would be desirable.

BRIEF DESCRIPTION

Aspects and advantages of the invention will be set forth in part in the following description, or may be obvious from the description, or may be learned through practice of the invention.

In one exemplary embodiment of the present disclosure, a tool electrode for electrical discharge machining a feature into a workpiece is provided. The tool electrode includes a plurality of electrode elements arranged in a digitized matrix representative of a tooling shape for machining the feature into the workpiece, wherein the plurality of electrode elements are arranged in the digitized matrix by digitizing an analog electrode tool shaped to machine the feature into the workpiece or a volume of the feature to be machined into the workpiece.

In another exemplary embodiment of the present disclosure, an EDM system for machining a feature into a workpiece is provided. The EDM system defining a vertical direction, a lateral direction, and a transverse direction each mutually orthogonal to one another. The EDM system includes a tank defining a volume for holding the workpiece within a dielectric fluid. The EDM system also includes a tool electrode selectively movable to machine the feature into the workpiece and comprising a plurality of electrode elements spaced apart from one another and arranged in a digitized matrix representative of a tooling shape for machining the feature into the workpiece, wherein the plurality of electrode elements are spaced apart from one another and arranged in the digitized matrix by digitizing an analog electrode tool configured to machine the feature into the workpiece or a volume of the feature to be machined into the workpiece.

In a further exemplary embodiment of the present disclosure, a method for machining a feature into a workpiece utilizing an EDM system is provided. The method includes digitizing an analog tool electrode or a volume of the feature to be machined into the workpiece to generate a data set, wherein the data set is descriptive of a digitized matrix comprised of a plurality of electrode elements and one or more error approximations. The method further includes arranging the plurality of electrode elements in the digitized matrix based at least in part on the data set. Additionally, the method includes drilling the workpiece to define the feature using the digitized matrix of electrode elements. Moreover, the method also includes orbiting the digitized matrix of electrode elements to further define the feature by removing the one or more error approximations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 provides a schematic, top plan view of a digitization process for digitizing an analog tool electrode according to exemplary embodiments of the present disclosure;

DETAILED DESCRIPTION

Figure 1:
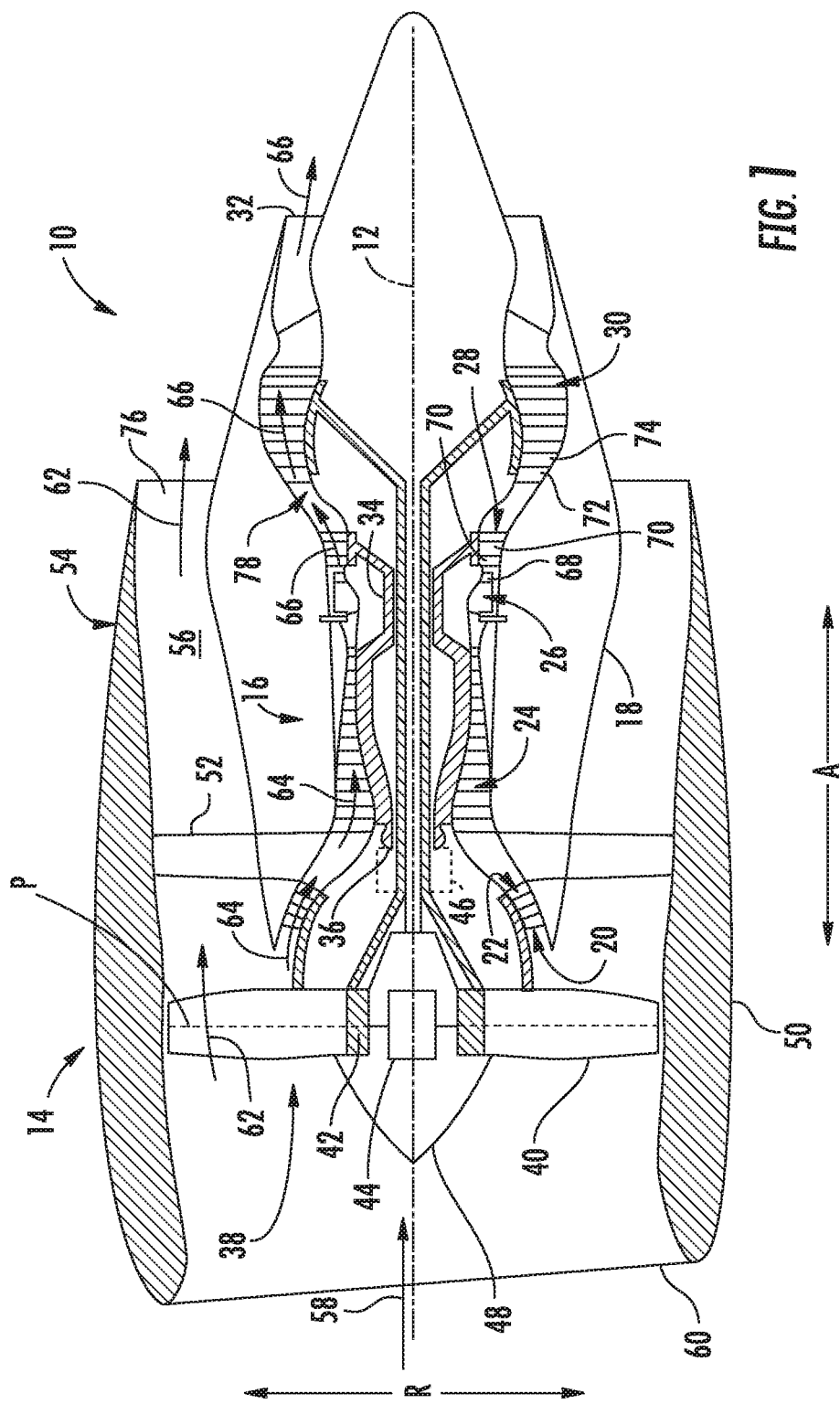
FIG. 1 provides a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Exemplary aspects of the present disclosure are directed to tool electrodes for EDM systems. Exemplary aspects of the present disclosure are also directed to methods for EDM machining. In one exemplary aspect, a tool electrode for machining features into a workpiece is provided that allows for increased machining speed without sacrificing the quality of the machined features. Moreover, a tool electrode is provided that eliminates or reduces the high cost associated with customized tool electrodes. In particular, a tool electrode is provided that includes a plurality of electrode elements arranged and spaced apart in a digitized matrix or array representative of a tooling shape for machining features into a workpiece. The electrode tubes can be electrode tubes or rods, for example. The tooling shape can be, for example, a mirror shape of the feature to be machined into the workpiece. The plurality of electrode elements are arranged in the digitized matrix by digitizing an analog electrode tool shaped to machine the feature into the workpiece. For example, the analog electrode tool can be a conventional single-pieced electrode tool. Additionally or alternatively, the plurality of electrode elements may be arranged in the digitized matrix by digitizing a volume of the feature to be machined into the workpiece. Upon digitizing the analog electrode tool or the volume of the feature to be machined into the workpiece, a data set is generated that is descriptive of how the electrode elements are to be arranged in the digitized matrix, the number of electrode elements to include in the matrix, and one or more error approximations. Then, the electrode elements are arranged in the digitized matrix. Thereafter, the tool electrode made up of electrode elements are used to machine the workpiece to define the feature and diminish the error approximations by orbit motion. The electrode elements can be independently powered for improved machining flexibility, including the ability to locally control the material removal rates and surface finishes, as well as increasing the material removal rate without increasing discharge energy or surface roughness. Moreover, the electrode elements can independently flush contaminated dielectric fluid proximate the working surface of the workpiece such that localized flushing can be achieved. In this way, flushing can be controlled to optimize EDM machining efficiency and performance.

FIG. 1 is a schematic cross-sectional view of a gas turbine engine in accordance with an exemplary embodiment of the present disclosure. More particularly, for the embodiment of FIG. 1, the gas turbine engine is a turbofan jet engine 10, referred to herein as "turbofan engine 10." As shown in FIG. 1, the turbofan engine 10 defines an axial direction A and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

During operation of the turbofan engine 10, a volume of air 58 enters turbofan 10. As the volume of air 58 passes across blades 40 of fan 38, a first portion 62 of the air 58 is directed or routed into a bypass airflow passage 56 and a second portion 64 of the air 58 is directed or routed into the LP compressor 22. The pressure of the second portion 64 of air is then increased as it is routed through the high pressure (HP) compressor 24 and into the combustion section 26, where it is mixed with fuel and burned to provide combustion gases 66. The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate and thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate and thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion 62 of air is substantially increased as the first portion 62 of air is routed through the bypass airflow passage 56 before it is exhausted from a fan nozzle exhaust section 76 of the turbofan 10, also providing propulsive thrust. Further, the HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, such as components of the combustion and/or turbine sections, may comprise a ceramic matrix composite (CMC) material, which is a non-metallic material having high temperature capability. Exemplary CMC materials utilized for such components may include silicon carbide (SiC), silicon nitride, or alumina matrix materials and combinations thereof. Ceramic fibers may be embedded within the matrix, such as oxidation stable reinforcing fibers including monofilaments like sapphire and silicon carbide (e.g., Textron's SCS-6), as well as roving and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth or fabric rather than as a tape.

In accordance with exemplary embodiments of the present disclosure, CMC components, as well as other composite components and components formed of other materials, can be machined by exemplary EDM processes and EDM systems described herein. Generally, to machine a component via an EDM process, a tool electrode is positioned proximate the component (i.e., the workpiece electrode). Then, an electrical voltage is applied between the tool electrode and the component workpiece. When the intensity of the electric field between the tool electrode and the workpiece exceeds the resistance of the dielectric medium, a current flows from the tool electrode to the workpiece, or vice versa, removing material from both the tool electrode and the workpiece. In this way, various features can be machined into a component via EDM. Exemplary EDM systems and methods are provided below.

Figure 2:
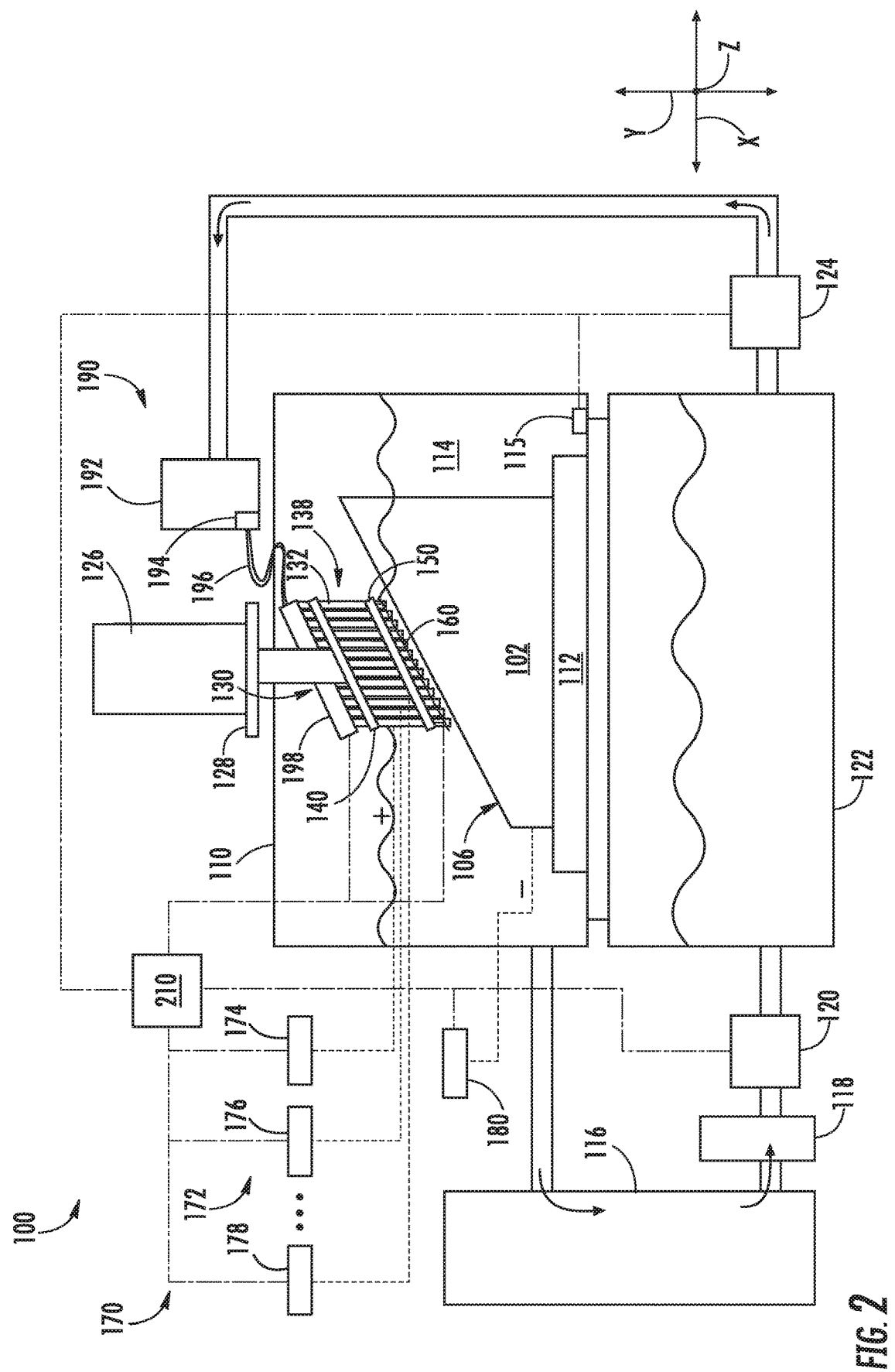
FIG. 2 provides an exemplary EDM system according to an exemplary embodiment of the present disclosure.
Figure 3:
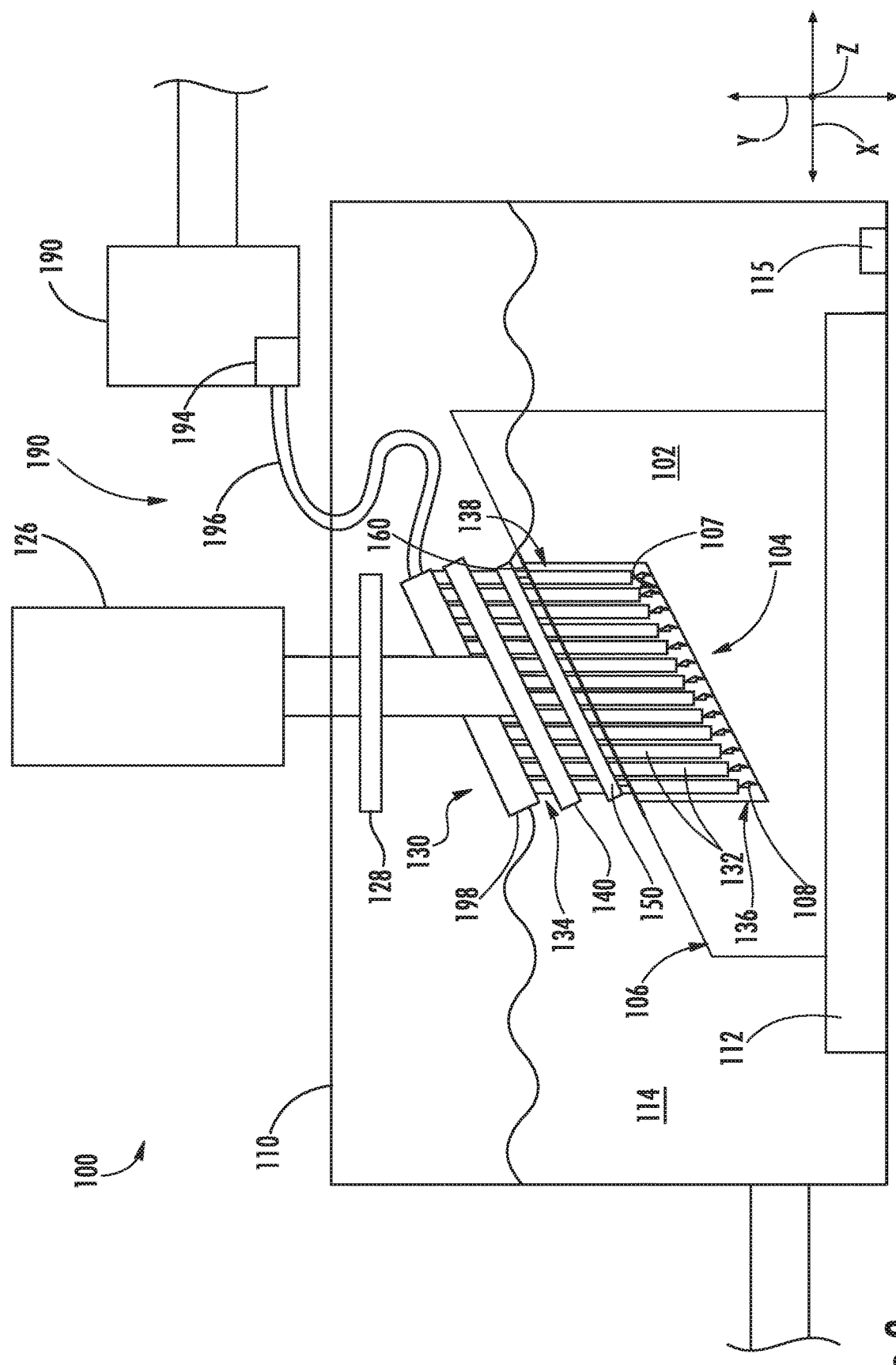
FIG. 3 provides a close up view of a tool electrode of the EDM system of FIG. 2 machining a workpiece electrode.

FIGS. 2 and 3 provide an exemplary EDM system for machining various features into components using electrical discharges or sparks according to various exemplary embodiments of the present disclosure. In particular, FIG. 2 provides a schematic view of an EDM system 100 and FIG. 3 provides a close up view of a tool electrode 130 of the EDM system 100 of FIG. 2 machining a feature 104 into a surface 106 of a workpiece 102. The workpiece 102 shown in FIGS. 2 and 3 may be a CMC component, such as e.g., a nozzle of HP turbine stator vane 68 or LP turbine stator vane 72 (FIG. 1). Often, turbine nozzles require seals or sealing members to help prevent combustion gases 66 from leaking from the hot gas path 78 to, e.g., other portions of the core engine 16 (FIG. 1). Such seals or sealing members may be positioned in a slot machined into a surface of the nozzle to help ensure the seals are properly placed and do not shift position during assembly or engine operation. FIG. 3 illustrates one seal slot, denoted as feature 104, in the process of being defined in CMC component workpiece 102 via an EDM machining process. Other seal slots may be machined into the workpiece as well. Moreover, in some embodiments, one or more apertures, grooves, depressions, or other features, e.g., for providing cooling fluid to the CMC component, may be defined in CMC workpiece 102 in addition to or as an alternative to the seal slot feature 104 shown in FIG. 3 in accordance with the processes and systems described herein.

Seal slots, such as seal slot feature 104 of FIG. 3, may have high aspect ratios, or a large ratio of slot depth to slot width. In some embodiments, the slot aspect ratio may range from about 1 to about 80, while in particular embodiments, the slot aspect ratio generally may be on the order of 5 or greater. In one exemplary embodiment, the slot depth may be about 0.160" and the slot width may be about 0.030", such that the aspect ratio is about 5.333. Typical slot widths may range from about 0.01" to about 0.1" but, in appropriate embodiments, may be as large as 1". In an exemplary embodiment, a high aspect ratio slot feature 104 may be defined using the EDM system 100 and methods described herein.

As shown in FIG. 2, the EDM system 100 is configured as a ram EDM system. The EDM system 100 defines a vertical direction Y, a lateral direction X, and a transverse direction Z. The vertical direction Y, lateral direction X, and transverse direction Z are mutually orthogonal to one another and form an orthogonal direction system. The EDM system 100 includes a tank 110 in which the electrode workpiece 102 is disposed. The workpiece 102 is held in place by a fixture 112. The tank 110 is filled with and holds a suitable dielectric fluid 114, such as a dielectric oil, so that the electrode workpiece 102 is immersed in the dielectric fluid 114. The dielectric fluid 114 insulates against electric currents (except for discharging plasma channels), deionizes the discharged plasma channels, cools the machined areas (e.g., areas proximate the working surface 107 as shown in FIG. 3), and flushes away machining debris. A filter system 116 is positioned downstream of the tank 110 and is fluidly connected with the tank 110 for filtering contaminated dielectric fluid 114. A chiller 118 is positioned downstream of the filter system 116 and is operatively configured to remove heat generated during the spark erosion process from the dielectric fluid 114.

A circulation pump 120 is fluidly connected with and is positioned downstream of the filter system 116 and chiller 118 and is operatively configured to circulate the dielectric fluid 114 from the tank 110 to a reservoir 122. The filtered dielectric fluid 114 is stored in the reservoir 122 until the dielectric fluid 114 is needed in the tank 110. A second circulation pump 124 is positioned downstream of the reservoir 122 and is fluidly connected with the reservoir 122. The second circulation pump 124 circulates the filtered dielectric fluid 114 back to tank 110. As will be described in greater detail herein, the filtered dielectric fluid 114 can be returned to the tank 110 for flushing purposes and cooling of the machined areas. A fluid level detection device 115 or sensor can be positioned within the tank 110 for detecting when the dielectric fluid 114 reaches a predetermined depth or fill level. In this way, the depth of the dielectric fluid 114 in the tank 110 is maintained at a depth optimal for EDM machining.

As further shown in FIG. 2, the EDM system 100 includes a servo mechanism 126, a ram 128, and tool electrode 130. The servo mechanism 126 is coupled with the ram 128 and the ram 128 is coupled with the tool electrode 130. The servo mechanism 126 is operatively configured to control the positioning of the ram 128, and as the ram 128 is coupled with the tool electrode 130, the servo mechanism 126 is likewise operatively configured to control the position of the tool electrode 130 relative to the workpiece 102. Stated differently, the servo mechanism 126 is configured to control the gap between the tool electrode 130 and the workpiece 102. The servo mechanism 126 can actuate the ram 128 and coupled tool electrode 130 along the vertical direction Y, the lateral direction X, and/or the transverse direction Z. In some embodiments, the servo mechanism 126 can translate the ram 128 and coupled tool electrode 130 along the vertical direction Y for drilling into the workpiece 102 and about the vertical direction Y for orbiting, such as e.g., in a circular or linear path. In this way, the tool electrode 130 may be advanced toward and retracted from the workpiece for EDM drilling and may be moved laterally and/or transversely for EDM orbiting.

As shown in FIG. 3, the tool electrode 130 includes a plurality of electrode elements 132 spaced apart from one another and arranged in a digitized matrix 138 representative of a desired tooling shape. The electrode elements 132 can be solid rods, hollow tubes, plates, or another suitable geometry that has a substantially greater vertical height than both its horizontal width and transverse depth. The horizontal width of the electrode element need not be equal to its transverse depth. For this embodiment, the electrode elements 132 are tubes. Moreover, for this embodiment, the tooling shape is a tilted parallelogram volume, and as such, the electrode elements 132 arranged in the tilted parallelogram tooling shape are configured to machine a seal slot into the workpiece. The tooling shape can be any shape that represents the mirror shape or volume of the feature to be machined into the workpiece. For instance, if the feature to be machined into the workpiece is a blind cylindrical volume (i.e., a cylinder volume that does not extend through the workpiece), the electrode elements 132 can be spaced apart and arranged in a tooling shape representative of the mirror shape or volume of the blind cylindrical feature to be machined.

The electrode elements 132 are spaced apart from one another and arranged in the desired tooling shape by digitizing an analog tool electrode configured to machine the desired feature. An analog tool electrode can be, for example, a conventional solid piece electrode configured to machine the desired feature into the workpiece. Additionally or alternatively, the electrode elements 132 are spaced apart from one another and arranged in the desired tooling shape by digitizing a volume of the analog feature to be machined into the workpiece. By digitizing an analog tool electrode or the volume of the feature to be machined into the workpiece, the electrode elements 132 are organized and structured in a digitized matrix or digitized battery representative of the desired tooling shape. The digitization of an analog tool electrode or the volume of the feature to be machined into the workpiece such that the electrode elements 132 can be spaced apart and arranged in the desired tooling shape will be explained in greater detail herein.

The electrode elements 132 can be made of any suitable conducting material. In various embodiments, the electrode elements 132 can be made from brass, copper, copper alloys, graphite, molybdenum, silver, tungsten, combinations thereof, or another appropriate material or combination of materials. In some embodiments, the electrode elements 132 have substantially the same size cross section (e.g., diameter) and cross section shape. For instance, the electrode elements 132 can have a circular cross section, a rectangular cross section, a square cross section, a triangular cross section, a hexagonal cross section, or any other suitable cross section geometry. As used herein, the term "substantially," as it applies to the size of the tube cross sections is taken to account for small variations in tube size during manufacturing.

Figure 6:
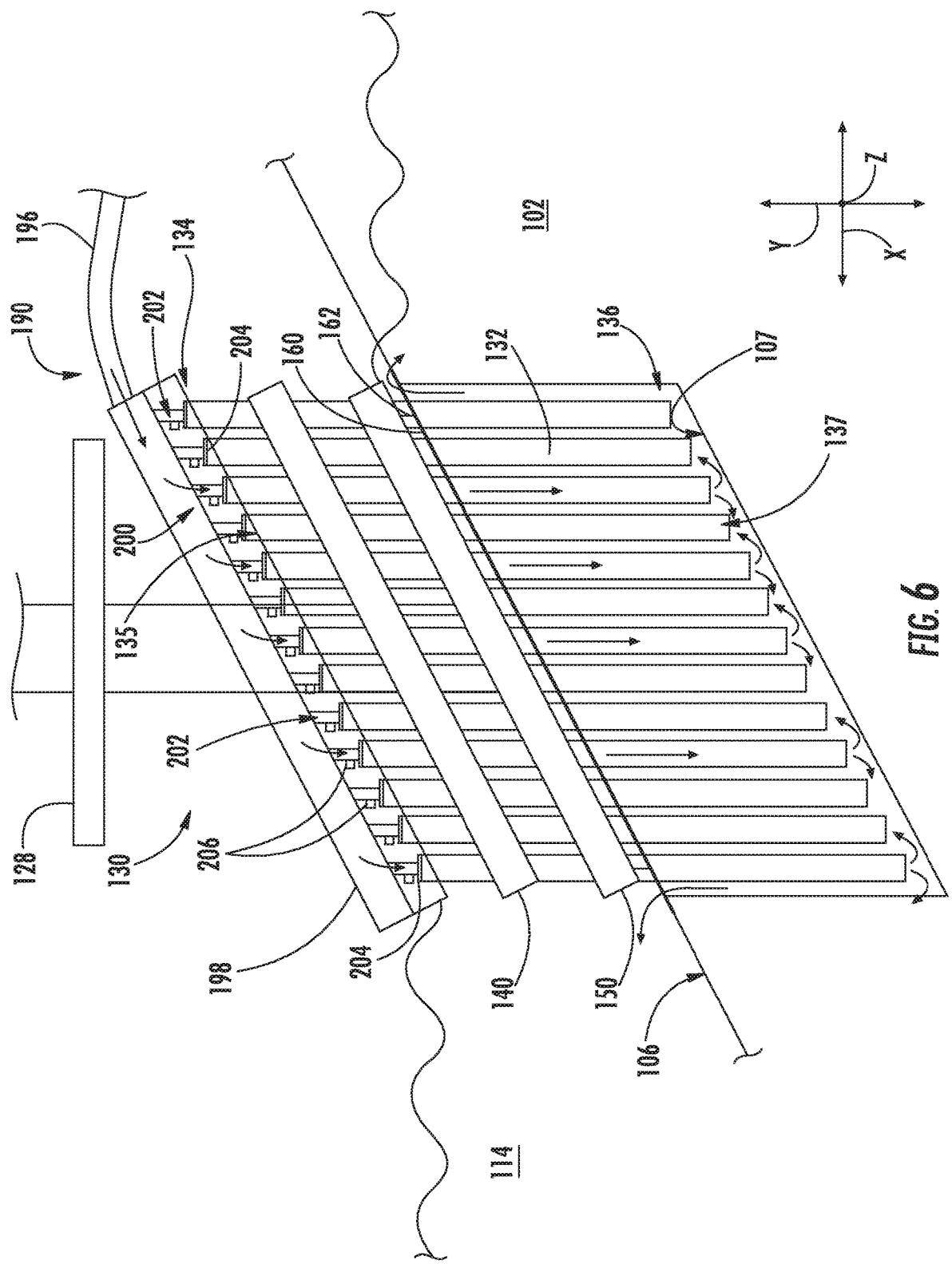
FIG. 6 provides a schematic view of an exemplary flushing system for an EDM system according to various exemplary embodiments of the present disclosure.

As shown further in FIG. 3, each electrode element 132 extends between a first end 134 and a second end 136. The electrode elements 132 can be flexible and can be solid rods or can be hollow structures with a through hole extending along the length of the tube, e.g., between the first end 134 and the second end 136. In this way, each of the electrode elements 132 define a tube inlet 135 at their respective first ends 134 and tube outlets 137 at their respective second ends 136 (FIG. 6). Further, in some embodiments, the electrode elements 132 are standard, off-the-shelf tubes each having substantially the same size cross section (e.g., diameter) and cross section shape. In this way, the cost of the tool electrode 130 may be minimized in that customized electrodes are generally not needed. The standard sized and shaped electrode elements 132 can be arranged into any desired tooling shape.

As further shown in FIGS. 2 and 3, the tool electrode 130 includes an electrode holder 140 or cartridge, an electrode guide 150, and a surface electrode guide 160. The electrode holder 140, the electrode guide 150, and the surface electrode guide 160 can be formed of any suitable insulating material, such as e.g., ceramics, fiber glass, or other suitable insulation materials. The electrode holder 140 couples the tool electrode 130 with the ram 128 and physically gangs the electrode elements 132 together. The electrode holder 140 may be pivotably coupled with the ram 128 such that the electrode holder 140 may be pivoted about e.g., the transverse direction Z. In this way, the tool electrode 130 can be oriented to machine various features into the workpiece having different geometries.

The electrode guide 150 facilitates alignment of the electrode elements 132 and guides the electrode elements 132 as they are lowered to machine the workpiece 102. For this embodiment, the electrode guide 150 is stationary and can be fixed to any suitable structure, such as e.g., a sidewall of the tank 110. In alternative exemplary embodiments, the electrode guide 150 may also be moveable along the vertical direction Y to adjust its distance relative to the workpiece surface 106. As shown in FIG. 2, the electrode tool 130 is positioned above the workpiece 102 along the vertical direction Y. The electrode guide 150 is spaced apart from the electrode holder 140 along the vertical direction Y as first distance. As the electrode tool 130 is lowered along the vertical direction Y to machine the workpiece 102, the electrode holder 140 becomes much closer to the electrode guide 150 and is spaced apart from the electrode guide 150 a second distance. By guiding the electrode elements 132 with electrode guide 150, advantageously, the electrode elements 132 may better maintain their orientation and spacing as they are advanced, retracted, and/or orbited about to machine the workpiece 102.

In addition, for this embodiment, tool electrode 130 includes surface electrode guide 160. Surface electrode guide 160 is coupled with the electrode guide 150 and assists with physically ganging the electrode elements 132 at their respective second ends 136, thereby physically constraining the electrode elements 132 at two locations along their respective lengths. Moreover, when the tool electrode 130 is advanced toward the working surface 107 of the workpiece 102 during machining, the surface electrode guide 160 is positioned such that it sits on and touches the original surface 106 of the workpiece 102. This ensures that the electrode elements 132 are appropriately positioned, oriented, and spaced during machining.

Figure 4:
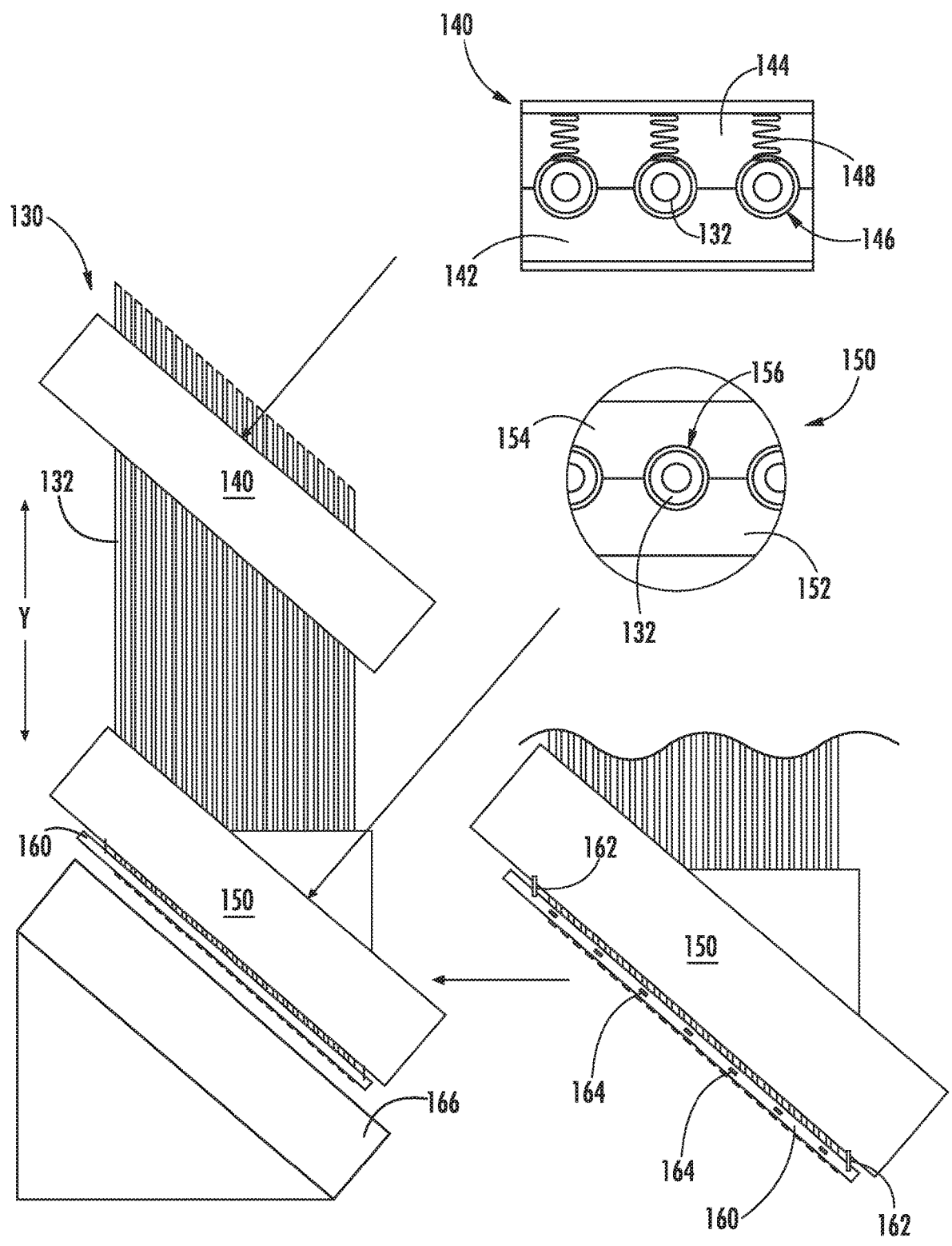
FIG. 4 provides a schematic view of an exemplary tool electrode for an EDM system according to various exemplary embodiments of the present disclosure.

FIG. 4 provides a schematic view of an exemplary tool electrode 130 according to various embodiments of the present disclosure. In particular, FIG. 4 further illustrates exemplary aspects of tool electrode 130. As shown, the electrode holder 140 includes a first clamping member 142 and an opposing second clamping member 144. When clamped together, the first member 142 and the second member 144 secure and hold the electrode elements 132 in place. Each of the electrode elements 132 may be fit into one of the openings 146 defined by the first and second members 142, 144 when they are clamped together. The electrode elements 132 can be clamped on the electrode holder 140 by respective clamping springs 148. The springs 148 bias their respective electrode elements 132 to physically constrain and secure them in place. Notably, the electrode holder 140 secures the electrode elements 132 in place and prevents the electrode elements 132 from contacting one another.

As further shown in FIG. 4, the electrode guide 150 includes a first guide member 152 and an opposing second guide member 154. Each of the electrode elements 132 may be fit into one of the openings 156 defined by the first and second guide members 152, 154 when they are fit together. The openings 156, or through holes in this embodiment, are precise and smooth so that the electrode elements 132 can be slide into and out of the electrode guide 150 with ease. Moreover, the openings 156 of the electrode guide 150 are aligned with the openings 146 of the electrode holder 140 such that straight electrode elements 132 can be secured by the electrode holder 140 and slid into the electrode guide 150. In alternative exemplary embodiments, the electrode guide 150 can be formed as a single member or piece.

The surface electrode guide 160 is shown in FIG. 4 coupled with the fixed electrode guide 150 via connection arms 162. The connection arms 162 may be adjustable e.g., telescopically adjustable, so that the surface electrode guide 160 can remain coupled with the electrode guide 150 as the electrode tool 130 is advanced or retracted from the workpiece 102. For this embodiment, the surface electrode guide 160 includes one or more sensors 164 mounted to or integrally formed with the surface electrode guide 160. The sensors 164 can be configured to sense the spacing between the electrode elements 132 to ensure they are properly oriented and arranged to machine the desired feature 104 into the workpiece 102.

As further depicted in FIG. 4, the electrode elements 132 can be adjusted by an electrode pre-setter 166. The electrode pre-setter 166 provides an alignment tool for aligning the electrode elements 132 in the desired tooling shape. As shown, the second ends 136 of the electrode elements 132 can be pressed against the electrode pre-setter 166 to align the electrode elements 132 to the appropriate height along the vertical direction Y. For instance, prior to clamping the electrode elements 132 with the electrode holder 140, the second ends 136 of the electrode elements 132 can be pressed against the surface of the pre-setter to align the electrode elements along the vertical direction Y, and then the electrode elements 132 can be secured in place by the electrode holder 140. The pre-setter 166 can be made of any suitable materials. As one example, the pre-setter 166 can be made of a rubber material so that when the electrode elements 132 are pressed against the surface of the electrode pre-setter 166, the electrode elements 132 are not damaged. The electrode pre-setter 166 can be positioned inside the tank 110 (FIGS. 2 and 3) or may be positioned outside of the tank 110.

Returning to FIG. 2, the EDM system 100 also includes a power system 170 for delivering power to various systems and devices of the EDM system 100. For this embodiment, the EDM system 100 includes a plurality of power branches. In particular, the EDM system 100 includes a plurality independent pulse braches 172 that are each configured to provide power to one of the electrode elements 132 of the digitized matrix 138. In this way, each of the plurality of electrode elements 132 are independently powered. For instance, a first electrode element of the digitized matrix 138 can be independently powered by a first pulse generator 174, a second electrode element can be independently powered by a second pulse generator 176, and an Nth electrode element can be independently powered by an Nth pulse generator 178 where the Nth electrode element is the total number of electrode elements in the digitized matrix 138.

The pulse braches 172 can be, for example, pulsed DC power supplies (PDC) configured to provide a plurality of rectangular or square wave signals to their respective electrode elements 132. In alternative embodiments, the pulse braches 172 can send sinusoidal pulses or other wave forms. As depicted in FIG. 2, the plurality of independent pulse braches 172 are each configured to power or charge their respective electrode elements 132 with the same electrical sign. For instance, for this embodiment, the independent pulse braches 172 are shown imparting a positive polarity, denoted with the plus sign (+), on their respective electrode elements 132. Accordingly, for this embodiment, each of the electrode elements 132 are positively charged. Alternatively, the independent pulse braches 172 may impart a negative polarity on their respective electrode elements 132.

As further shown in FIG. 2, a common pulse generator 180 is configured to provide power to or charge the workpiece 102. The common power supply 180 can be a pulsated current or pulsated voltage power supply, for example. The common pulse generator 180 powers or charges the workpiece 102 so that the workpiece 102 is charged with either a negative or positive polarity. As will be appreciated, the common pulse generator 180 is configured to impart a pulse current to the workpiece 102 that is opposite the sign of the polarity on the electrode elements 132. That is, if the electrode elements 132 are positively charged, the common pulse generator 180 imparts a negative polarity, denoted by negative sign (−), on the workpiece 102. In contrast, if the electrode elements 132 are negatively charged, the common pulse generator 180 imparts a positive polarity on the workpiece 102. In this way, there is a potential differential between the electrode elements 132 of the tool electrode 130 and the workpiece 102 such that electrical discharges 108 or sparks may bridge the dielectric fluid 114, e.g., as shown in FIG. 3.

Figure 5:
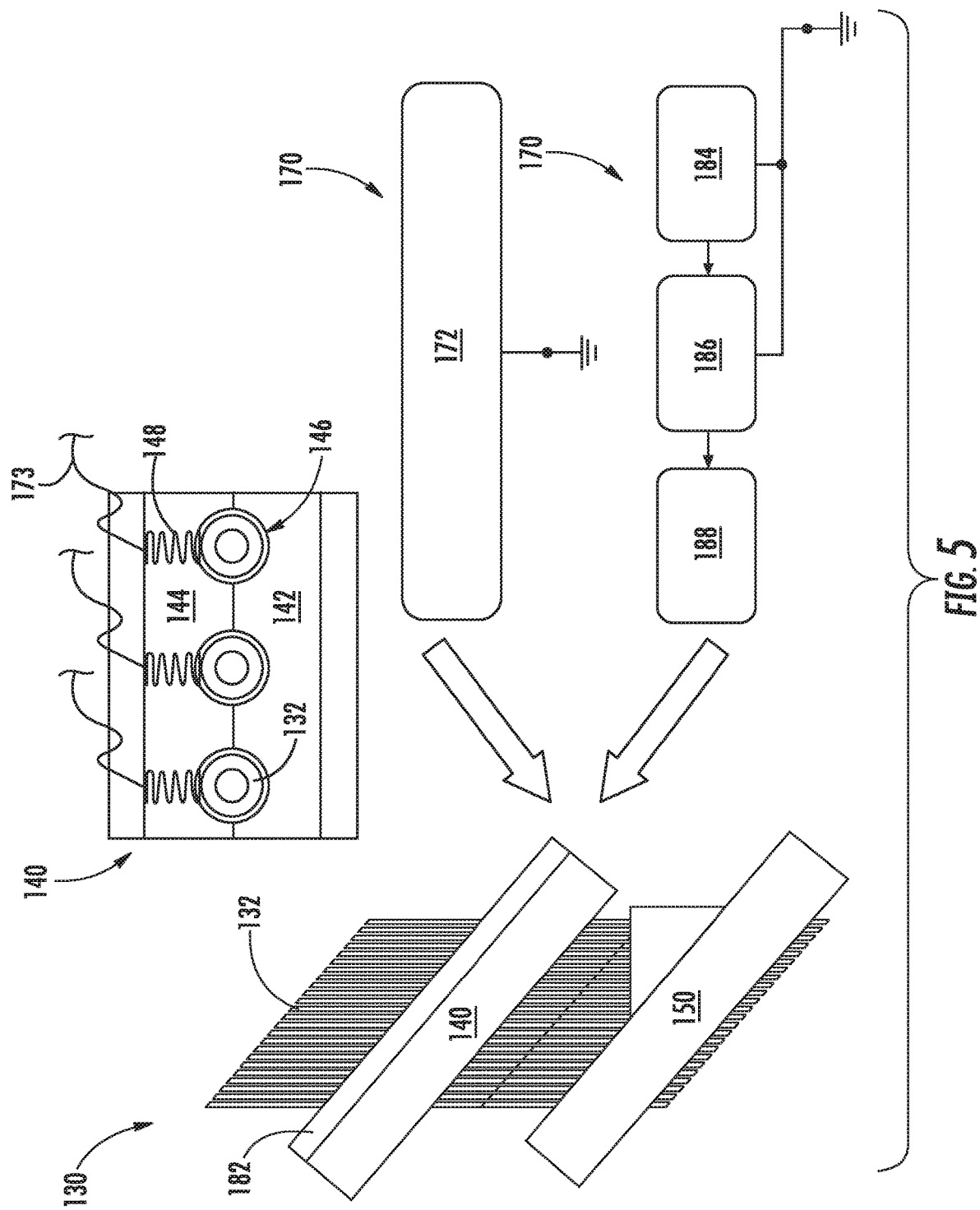
FIG. 5 provides a schematic view of various power systems for an EDM system according to various exemplary embodiments of the present disclosure.

As shown particularly in FIG. 5, in some embodiments, the isolated leads 173 stemming from the independent pulse braches 172 can be electrically connected with their respective electrode elements 132 via the clamping springs 148. In alternative exemplary embodiments, the isolated leads stemming from the independent pulse braches 172 can be electrically connected directly with their respective electrode elements 132. In some embodiments, as depicted in FIG. 5, the electrode holder 140 includes an end connector 182 integrally formed with or mounted to the electrode holder 140. For instance, the end connector 182 can be a SIL (single in line) connector on a PCB (printed circuit board). The isolated leads stemming from the independent pulse braches 172 can be electrically connected with the end connector 182. The end connector 182 can include spring loaded taps that electrically connect the isolated leads with the electrode elements 132 of the tool electrode 130, the springs 148, or another suitable intermediate electrically conducting component electrically connected with the electrode elements 132. Further, as shown in FIG. 5, the independent pulse braches 172 can be grounded with a common ground.

In alternative embodiments, as shown in FIG. 5, a power source 184 can provide power to a pulse generator 186. The pulse generator 186 generates pulses at a predetermined interval and forwards the pulsed power to a power splitter 188. The power splitter 188 can break down the pulsed electrical current into multiple independent circuits or leads that are electrically connected with the electrode elements 132 in a suitable manner, such as e.g., attaching the leads directly to the electrode elements 132, attaching the leads to the clamping springs 148, or electrically connecting the isolated independent leads to the end connector 182.

By independently powering the electrode elements 132, the EDM machining process can be sped up without a quality penalty. That is, the material removal rate can be increased without increasing the surface roughness of the machined area or areas. As each electrode element 132 has its own dedicated isolated power circuit, the spark from each electrode element 132 can be controlled to optimize the machining of the feature into the workpiece. That is, the material removal rate and surface finish of the machined feature can be controlled locally at each electrode element, providing machining flexibility. As each tool electrode-workpiece gap can differ (e.g., depending on local debris generation and dielectric flushing), independent and dedicated power supplies for distinct electrode elements enables multiple sparks, for a high material removal rate, and a lower power level for high surface quality finishing.

Returning again to FIG. 2, the EDM system 100 includes a flushing system 190. As noted previously, after the dielectric fluid 114 is filtered in filtration system 116, cooled in chiller 118, and then stored in reservoir 122, the dielectric fluid 114 can be returned to the tank 110 for flushing purposes and cooling of the machined areas. For this embodiment, the second circulation pump 124 is configured to pressurize and circulate filtered dielectric fluid 114 from the reservoir 122 to a holding tank 192 positioned proximate the tool electrode 130. Dielectric fluid 114 collects in the holding tank 192 and is positioned proximate the tool electrode 130 so that the filtered and pressurized dielectric fluid 114 can be used "on demand" for flushing purposes. Moreover, for this embodiment, a pump 194 is disposed within the holding tank 192 such that the dielectric fluid 114 can be further pressurized before being supplied to the tank 110. A flexible hose 196 fluidly connects the holding tank 192 and the tool electrode 130. More particularly, the flexible hose 196 fluidly connects the holding tank 192 with a manifold 198. The manifold 198 is positioned proximate the first ends 134 of the electrode elements 132 as shown in FIGS. 2 and 3.

FIG. 6 provides a close up view of the tool electrode 130 and operation of the flushing system 190 according to an exemplary embodiment of the present disclosure. As shown, the filtered and pressurized dielectric fluid 114 is supplied to the manifold 198 from the holding tank 192 (FIGS. 2 and 3) via flexible hose 196. The dielectric fluid 114 flows into the manifold 198 and enters a main channel 200 defined by the manifold 198. After flowing into the main channel 200, the dielectric fluid 114 flows into a plurality of discrete channels 202, which are also defined by the manifold 198. As shown, each discrete channel 202 is fluidly connected with a corresponding electrode element 132, which in this example are hollow tubes. More particularly, each discrete channel 202 is fluidly connected with a corresponding electrode element 132 by a micro fitting 204. The micro fittings 204 are arranged in a matrix or array that is complementary to the arrangement and spacing the of the electrode elements 132. In some embodiments, the micro fittings 204 are controlled to selectively allow a pressurized flow of dielectric fluid 114 into their respective electrode elements 132. For instance, the micro fittings 204 can be controlled to be positioned in an open position or a closed position. In this way, the dielectric flow can be controlled to optimize flushing. The optimal flushing flow may differ depending on the tooling shape in which the electrode elements 132 are arranged. For example, in some instances, all of the micro fittings 204 can be controlled to an open position. In other embodiments, a select number of the micro fittings 204 can be controlled to an open position to create a particular flushing flowing proximate the working surface 107 of the workpiece 102.

After the dielectric fluid 114 flows into the discrete channels 202 and past the micro fittings 204, the dielectric fluid 114 flows into the tube inlets 135 of the hollow electrode elements 132. For this embodiment, the dielectric fluid 114 flows from the tube inlets 135 to the respective tube outlets 137 positioned proximate the working surface 107 of the workpiece 102 being machined. As shown in FIG. 6, the pressurized dielectric fluid 114 exits the electrode elements 132 through the tube outlets 137 and flushes away the debris-contaminated dielectric fluid proximate the working surface 107 of the feature 104 being machined. Although some of the electrode elements 132 are shown in FIG. 6 having dielectric fluid 114 flowing therethrough, it will be appreciated that each of the electrode elements 132 can have dielectric fluid passing therethrough for flushing and cooling of the machined areas.

Advantageously, by flowing dielectric fluid 114 through the plurality of electrode elements 132, multiple independent dielectric flushing can be achieved. As the rate of flushing it tied to machining speed, improved flushing allows for faster machining of the workpiece without a quality penalty. Moreover, controlled localized flushing can be achieved. As noted above, the micro fittings 204 can be controlled to selectively allow a flow of dielectric fluid 114 into their corresponding electrode element 132. In this way, as noted above, optimal flushing can be achieved. Moreover, micro flow sensors 206 positioned proximate each of the discrete channels 202 can be used to monitor the flow condition within their respective discrete channels 202 to ensure the dielectric fluid 114 is flowing at the proper flow rate for optimal flushing, among other viable uses.

As further shown in FIG. 2, the EDM system 100 includes a controller 210 operatively configured to control various aspects of the EDM system 100. The controller 210 can be, for example, a computer numerical control (CNC). To control the EDM system 100, the controller 210 is communicatively coupled with the various systems and devices of the EDM system 100. In particular, the controller 210 is communicatively coupled with the servo mechanism 126 for selectively moving the ram 128 and coupled tool electrode 130 about one or more of the vertical direction Y, lateral direction X, and transverse direction Z. The controller 210 is also communicatively coupled with circulation pump 120, the second circulation pump 124, and the fluid level detection device 115 disposed in tank 110. In this way, the dielectric fluid level within the tank 110 can be controlled. Further, the controller 210 is also communicatively coupled with the pump 194 disposed within holding tank 192, the micro fittings 204, and the micro flow sensors 206 of the flushing system 190 such that the flushing can be controlled. Moreover, the controller 210 is also communicatively coupled with the sensors 164 disposed along the surface electrode guide 160 so that the gap between the tool electrode 130 and the workpiece 102 can be controlled. Also, sensor feedback from the sensors 164 can be utilized by controller 210 to make adjustments of the flow rates for flushing. In addition, the controller 210 is also communicatively coupled with the various power supplies, including the pulse generators, such that machining operations are controlled and monitored to optimize EDM machining performance and efficiency. In some embodiments, the controller 210 can include a dedicated power management system for controlling the various power devices of the EDM system 100.

The controller 210 may include one or more processors and one or more memory units. The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For the embodiment depicted, the instructions include a software package configured to operate the controller 210 to, e.g., to operate the EDM system 100 and/or execute the exemplary method (300) and/or other methods disclosed herein.

It will be appreciated that the EDM system 100 described herein can include other components, such as e.g., a ventilation system, and devices not specifically described herein. Moreover, it will be appreciated that the configuration of EDM system 100 illustrated and described herein is exemplary. The EDM system 100 provided herein is provided to describe and illustrate the inventive aspects of the system and is not intended to limit the claim scope. Other configurations are possible.

Figure 7:
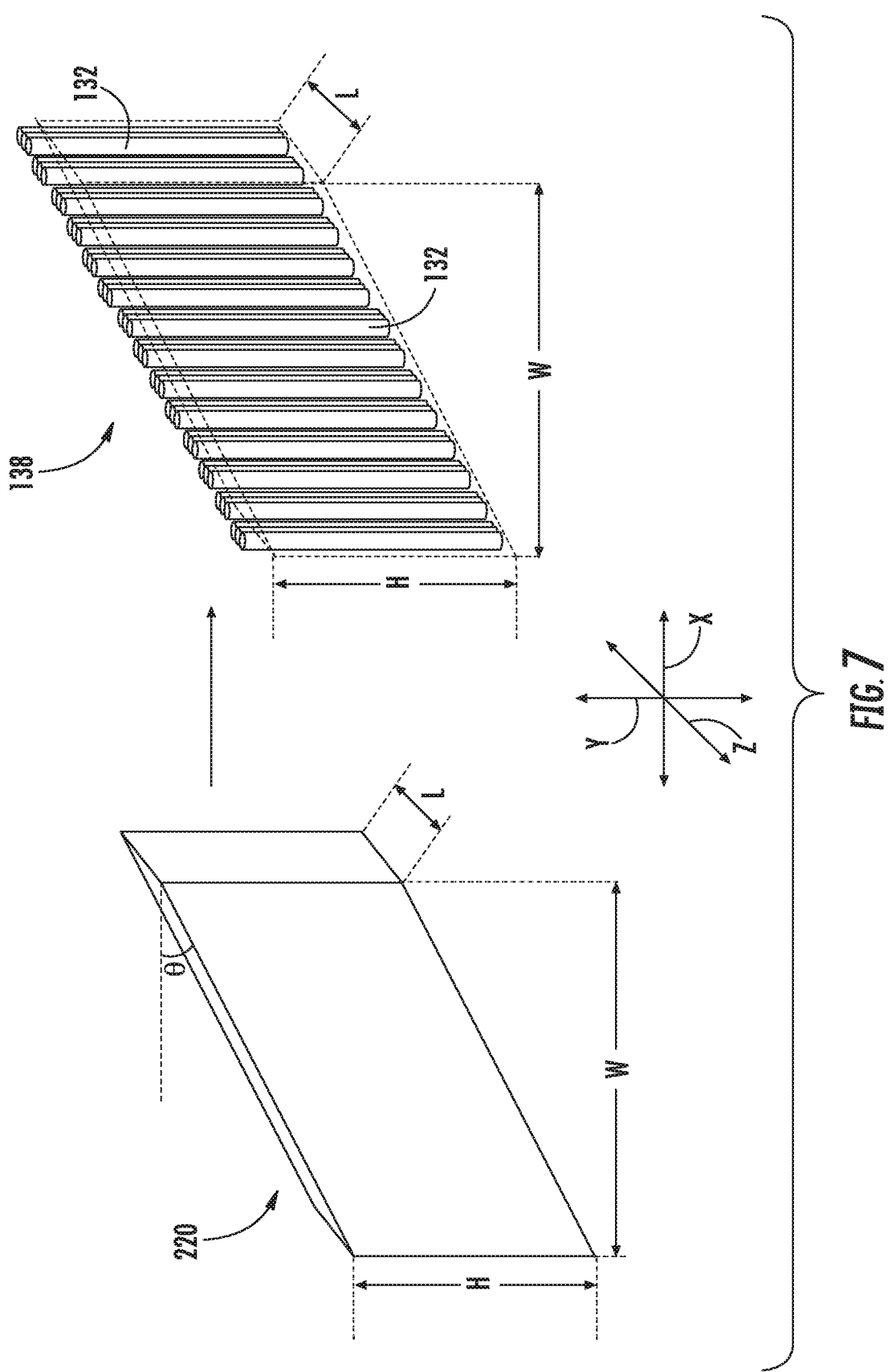
FIGS. 7 through 9 provide schematic views of a digitization process for digitizing an analog tool electrode according to exemplary embodiments of the present disclosure.
Figure 8:
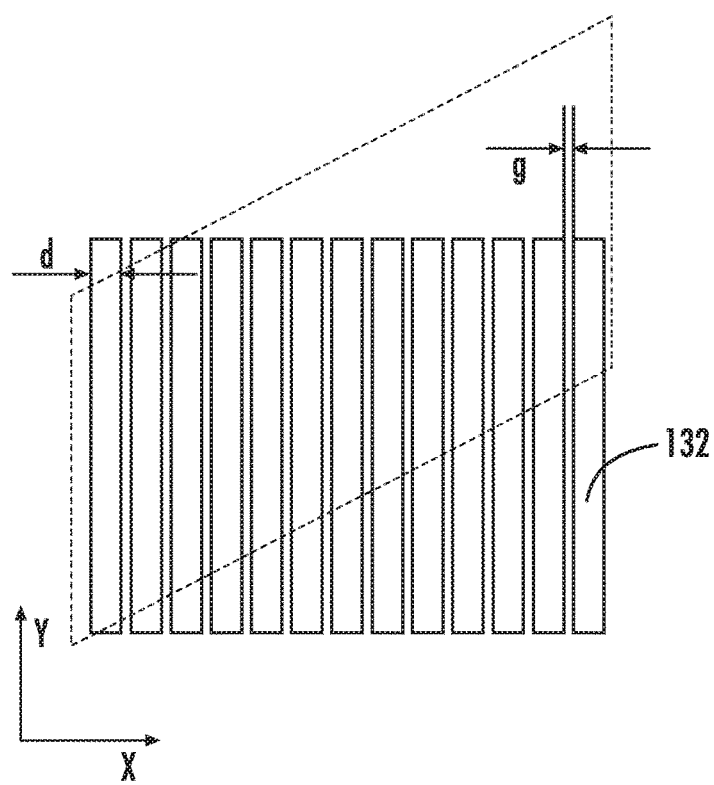
Figure 9:
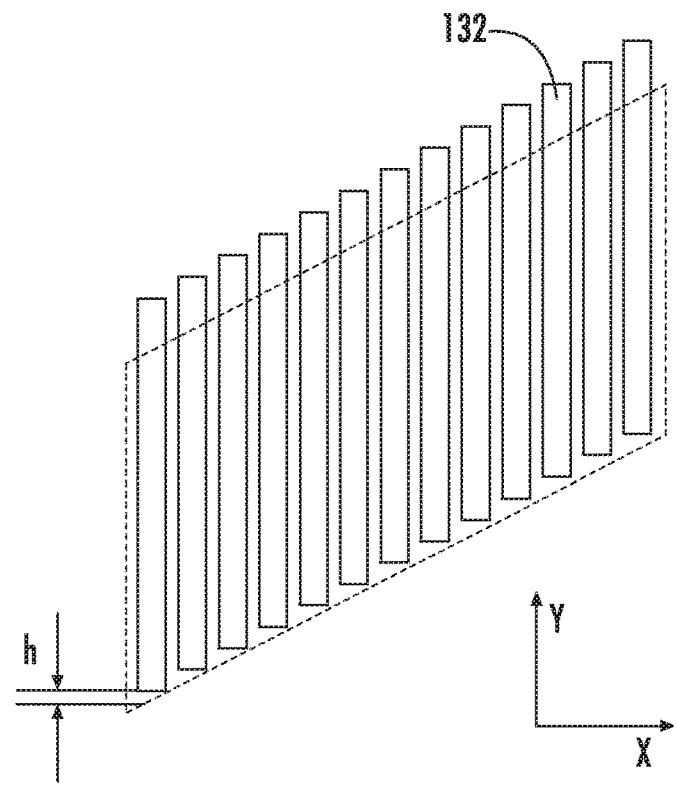

FIGS. 7 through 9 provide schematic views of an exemplary process for digitizing an analog tool electrode according to exemplary embodiments of the present disclosure. More particularly, FIG. 7 provides an analog tool electrode 220 digitized into a digitized matrix 138 of electrode elements 132. FIG. 8 provides a front view of electrode elements 132 depicting a process for determining the number of electrode elements to position along the lateral direction X of the digitized matrix 138 and for determining the approximation error in the lateral direction X. FIG. 9 provides a front view of electrode elements 132 depicting a process for determining the approximation error in the vertical direction Y.

As shown in FIG. 7, the analog tool electrode 220 has a length L, a width W, and a height H defining a volume of the analog tool electrode 220. The length L of the analog tool electrode 220 extends along the transverse direction Z, the width W of the analog tool electrode 220 extends along the lateral direction X, and the height H of the analog tool electrode 220 extends along the vertical direction Y. For this embodiment, the analog tool electrode 220 is a tilted parallelogram volume configured for machining seal slots into a workpiece, e.g., such as a CMC nozzle. Accordingly, as shown, the tilted parallelogram shape of the analog tool electrode 220 defines an angle θ with respect to the lateral direction X. That is, the titled parallelogram shape is tiled by an angle θ with respect to the lateral direction X.

As further depicted in FIG. 7, the analog tool electrode 220 is digitized such that the electrode elements 132 are arranged and spaced apart in a digitized matrix 138 representative of a desired tooling shape. The tooling shape is representative of or complementary to the mirror shape of the desired feature to be machined into the workpiece. Stated alternatively, the tooling shape is a digital rendering of the volume of the analog tool electrode 220. By digitizing the analog tool electrode 220, the relatively high cost of designing, manufacturing, manufacture set up, and maintenance of a customized analog tool electrode may be eliminated or reduced. As noted above, the electrode elements can be standard, off-the-shelf tubes that can be arranged to form any desired tooling shape for machining features into workpieces. Moreover, the digitized matrix 138 of electrode elements 132 is equivalent to numerous EDM machines, thereby improving cycle times and saving floor space. An exemplary manner in which the analog tool electrode 220 can be digitized by linear approximation is described below.

As shown in FIG. 8, a process for determining the number of electrode elements 132 along the lateral direction X and determining the error approximation along the lateral direction X is provided. The number of electrode elements 132 to position along the lateral direction X to digitize the analog tool electrode 220 is determined by the equation:

$$n_X = (w - g_X)/(d_X + g_X) \quad \text{(Equation 1)}$$

where $n_X$ is equal to the number of electrode elements to position along the lateral direction X, w is a width of the tooling shape along the lateral direction X, $g_X$ is a gap between adjacent electrode elements, and $d_X$ is an electrode element size along the lateral direction X. By way of example, suppose the width w of the desired tooling shape is 20 units, the electrode element size $d_X$ is 1 unit, and based on the electrode element size $d_X$, the optimal gap $g_X$ between adjacent electrode elements is 0.5 units. Utilizing Equation 1 as provided above, the resultant number of electrode elements to position along the lateral direction X is 13 electrode elements, or $n_X=(w-g_X)/(d_X+g_X)=(20-0.5)/(1+0.5)=13$. The gap $g_X$ between adjacent electrode elements is also the error approximation in the lateral direction X. Thus, in this embodiment, the error approximation in the lateral direction X is 0.5 units.

The number of electrode elements 132 to position along the transverse direction Z to digitize the analog tool electrode 220 is determined by the equation:

$$n_Z=(l-g_Z)/(d_Z+g_Z) \qquad \text{(Equation 2)}$$

where $n_Z$ is equal to the number of electrode elements positioned along the transverse direction Z, L is the length of the tooling shape along the transverse direction Z, $g_Z$ is a gap between adjacent electrode elements along the transverse direction Z, and $d_Z$ is an electrode element size along the transverse direction Z. By way of example, suppose the length L of the desired tooling shape is 5 units, the electrode element size $d_X$ is 1 unit, and based on the electrode element size $d_Z$, the optimal gap $g_Z$ between adjacent electrode elements along the transverse direction Z is 0.5 units. Utilizing Equation 2 as provided above, the resultant number of electrode elements to position along the transverse direction Z is 3 electrode elements, or $n_Z=(L-g_Z)/(d_Z+g_Z)=(5-0.5)/(1+0.5)=3$. The gap $g_Z$ between adjacent electrode elements is also the error approximation in the transverse direction Z. Once the number of electrode elements 132 to position along the lateral direction X and the transverse direction Z are determined, or $n_X$, $n_Z$, the total number of electrode elements 132 that will make up the digitized matrix 138 is known, as well as the spacing and arrangement of the electrode elements 132.

As shown in FIG. 10, a process for digitizing the analog tool electrode 220 in the vertical direction Y is provided. More particularly, a process for determining the error approximation along the vertical direction Y is provided. As illustrated in FIG. 7, the error approximation in the vertical direction Y is defined by:

$$h=d_X*\tan\theta \qquad \text{(Equation 3)}$$

where h is equal to the error approximation along the vertical direction Y, $d_X$ is the electrode element size along the lateral direction X, and the angle $\theta$ is the tilt of the analog tool electrode parallelogram with respect to the lateral direction X. By way of example, suppose the electrode element size $d_X$ is 1 unit and the angle $\theta$ is thirty degrees (30°). Utilizing Equation 3 above, the resultant error approximation in the vertical direction Y is 0.577 units, or $h=d_X*\tan\theta=1*0.577=0.577$. Thus, the error approximation in the vertical direction Y, denoted as h, is 0.577 units for this embodiment.

Once the error approximations in the lateral direction X, the transverse direction Z, and the vertical direction Y are determined and the number of electrode elements 132 are determined in the lateral direction X and the transverse direction Z, the plurality of electrode elements 132 can be arranged and spaced apart in the digitized matrix 138 representative of the desired tooling shape. For instance, the electrode elements 132 can be arranged as shown in a digitized matrix 138 as shown in FIG. 7.

In some embodiments, particularly where the tooling shape is an irregular shape, the number of electrode elements 132 to include within the digitized matrix 138 and their spacing and arrangement is determined as follows. With reference to FIG. 10, to digitize the analog tool electrode 220, the maximum width $W_{MAX}$ of the analog electrode tool 220 is determined along the lateral direction X. Then, the number of electrode elements 132 is determined using Equation 1 for $W_{MAX}$. Upon executing the calculation, the number of electrode elements 132 to position along $W_{MAX}$ is determined. Thereafter, the maximum length $L_{MAX}$ of the analog electrode tool 220 is determined along the transverse direction Z and the number of electrode elements 132 is determined using Equation 2 for $L_{MAX}$. Upon executing the calculation, the number of electrode elements 132 is determined along $L_{MAX}$. Accordingly, the number of rows of (e.g., $W_1$, $W_2$, $W_3$, $W_4$, $W_5$) and the number of columns (e.g., $L_1$, $L_2$, $L_3$, $L_4$, $L_5$) of electrode elements 132 for the digitized matrix 138 are known. Then, for each width row (or for each length column), the number of electrode elements 132 along that particular width row or length column is determined. In this way, the number of electrode elements 132 to be positioned within the digitized matrix 138, as well as the spacing and arrangement of the electrode elements 132, is determined.

With reference again to FIG. 3, a feature 104 can be machined into a workpiece 102 by electrode tool 130 in the following exemplary manner. Initially, the tool electrode 130 is moved or advanced proximate the surface 106 of the workpiece 102. The surface guide 160 sits on the workpiece surface 106 or can alternatively be positioned very near or proximate the surface 106. Thereafter, the servomotor 126 drives the ram 128 downward along the vertical direction Y, which causes the electrode holder 140 to advance the electrode tool 130 comprised of electrode elements 132 to slide vertically downward through guides 150 and 160 to a position proximate the surface 106. Then, an electrical voltage is applied between the tool electrode 130 and the workpiece 102. When the intensity of the electric field between the tool electrode 130 and the workpiece 102 exceeds the breakdown strength of the dielectric fluid 114, electrical discharges bridge the dielectric fluid 114 causing high temperature plasma to remove material from the workpiece 102.

The electrode tool 130 can commence forming the feature 104 via a drilling process with the electrode elements or rods 132. During drilling, the tool electrode 130 is moved generally along the vertical direction Y. Further, during drilling, the electrode tool 130 can be advanced and retracted along the vertical direction Y to create a "pumping" effect that provides further flushing of the contaminated dielectric fluid 114 to be removed from the machining areas. As there are gaps between the electrode elements 132 arranged in the digitized matrix 138, some areas of the workpiece 102 are not machined or satisfactorily machined during drilling. Thus, after drilling, the tool electrode 130 is controlled to undergo lateral orbiting or lateral oscillation to remove the areas of the workpiece 102 that were not machined or satisfactorily machined during drilling. Stated alternatively, after drilling, the tool electrode 130 is controlled to perform a lateral orbiting technique to diminish the approximation errors in the lateral, transverse, and vertical directions X, Z, Y. Orbiting may be a linear lateral motion, a circular lateral motion, or some other suitable lateral motion.

Drilling and orbiting may be an iterative process in which the electrode tool 130 is controlled to drill and then orbit, drill and then orbit, and so on, as the feature 104 is machined into the workpiece 102. As shown in FIG. 3, the electrode tool 130 has at least partially defined the feature 104 and is machining the working surface 107 to further define the feature 104. As shown, electrical discharges 108 are bridging the dielectric fluid 114 causing high temperature plasma to remove material from the working surface 107 of the workpiece 102.

Figure 11:
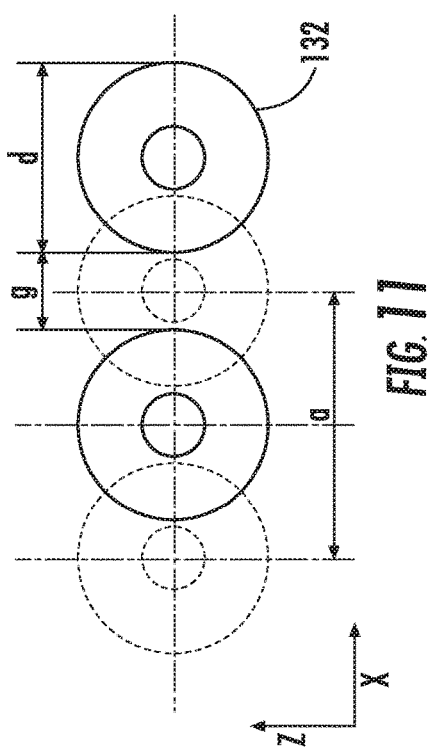

In one example, as shown in FIG. 11, where the electrode elements 132 have circular cross sections, to remove the material of the workpiece between adjacent electrode elements 132 for the error approximation in the lateral direction X, the electrode elements 132 undergo linear orbiting a distance of:

$$a_X \geq 2*g_X + d_X \quad \text{(Equation 4)}$$

where $a_X$ is the linear orbiting distance of the electrode elements 132 to remove the error approximation along the lateral direction X, $g_X$ is the gap between adjacent electrode elements along the lateral direction X, and $d_X$ is an electrode element size along the lateral direction X. By way of example, suppose the electrode element size $d_X$ is 1 unit, and based on the electrode element size $d_X$, the optimal gap $g_X$ between adjacent electrode elements along the lateral direction X is 0.5 units. Utilizing Equation 4 as provided above, the linear orbiting of the electrode elements 132 to remove the error approximation along the lateral direction X is greater than or equal to 2 units. Likewise, to remove the material of the workpiece between adjacent electrode elements 132 for the error approximation in the transverse direction Z, the electrode elements 132 undergo linear orbiting a distance of:

$a_Z \geq 2*g_Z + d_Z$ (Equation 5) where $a_Z$ is the linear orbiting distance of the electrode elements to remove the error approximation along the transverse direction Z, $g_Z$ is the gap between adjacent electrode elements along the transverse direction Z, and $d_Z$ is an electrode element size along the transverse direction Z. By way of example, suppose the electrode element size $d_Z$ is 1 unit, and based on the electrode element size $d_Z$, the optimal gap $g_Z$ between adjacent electrode elements along the lateral direction X is 0.5 units. Utilizing Equation 5 as provided above, the linear orbiting of the electrode elements 132 along the transverse direction Z is greater than or equal to 2 units.

Figure 12:
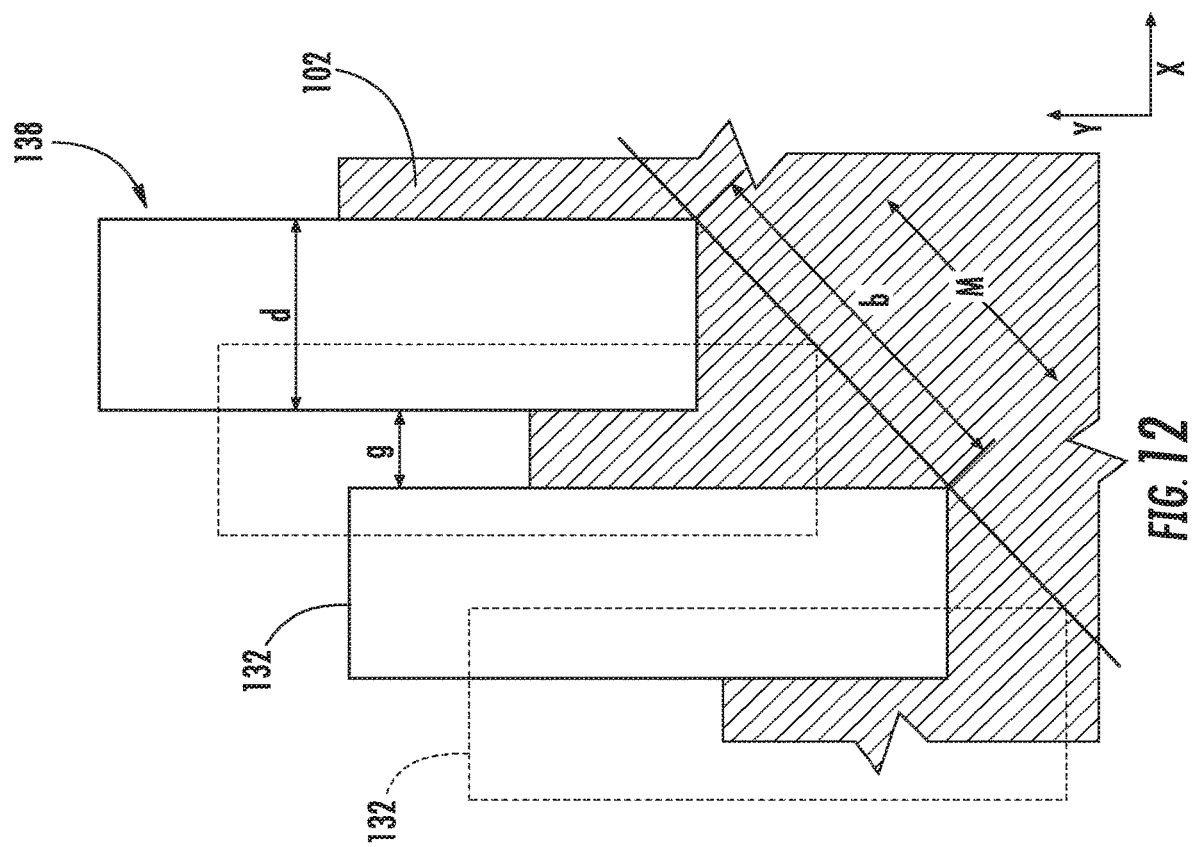
FIGS. 11 through 13 provide schematic views of an exemplary material removal process using a digitized tool electrode.

With reference to FIG. 12, once the tool electrode orbits linearly along the lateral and transverse directions X, Z, to remove the workpiece material 102 between adjacent electrode elements 132 for the error approximation in the vertical direction Y, the electrode elements 132 undergo linear orbiting a distance of:

$$b_Y \geq (2*g_X + d_X)/\cos\theta \quad \text{(Equation 6)}$$

where $b_Y$ is the linear orbiting distance of the electrode elements to remove the approximation error along direction Y, $g_X$ is the gap between adjacent electrode elements along the lateral direction X, $d_X$ is the electrode element size along the lateral direction X, and the angle theta θ is the tilt of the parallelogram shape of the analog electrode tool 220 with respect to the lateral direction X. By way of example, suppose the electrode element size $d_X$ is 1 unit, and based on the electrode element size $d_X$, the optimal gap $g_X$ between adjacent electrode elements along the lateral direction X is 0.5 units. Utilizing Equation 6 as provided above and supposing that the angle θ is thirty degrees (30°), the linear orbiting of the electrode elements to remove the error approximation along the vertical direction Y is greater than or equal to ≈2.31 units. As shown in FIG. 12, the electrode elements 132 of the digitized matrix 138 orbit in the direction M to remove material from workpiece 102. In particular, the electrode elements 132 move along the direction M between the electrode elements 132 shown in solid lines and the electrode elements 132 shown in phantom to remove the material defined by the approximation error along direction Y.

Figure 13:
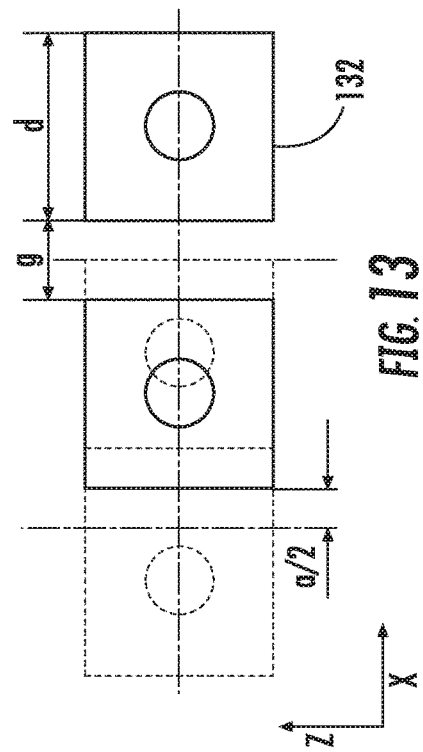

In another example, as shown in FIG. 13, where the electrode elements 132 have square cross sections, to remove the material of the workpiece between adjacent electrode elements 132 for the error approximation in the lateral direction X, the electrode elements 132 undergo linear orbiting a distance of:

$$\Delta a_X \geq 2*g_X \quad \text{(Equation 7)}$$

where $\Delta a_X$ is the linear orbiting distance or difference of the electrode elements 132 to remove the error approximation along the lateral direction X and $g_X$ is the gap between adjacent electrode elements along the lateral direction X. As such the linear orbiting of the electrode elements 132 to remove the error approximation along the lateral direction X is greater than or equal to the gap $g_X$ between adjacent electrode elements along the lateral direction X.

Likewise, to remove the material of the workpiece 102 between adjacent electrode elements 132 for the error approximation in the transverse direction Z, the electrode elements 132 undergo linear orbiting a distance of:

$$\Delta a_Z \geq g_Z \quad \text{(Equation 8)}$$

where $\Delta a_Z$ is the linear orbiting distance or difference of the electrode elements 132 to remove the error approximation along the transverse direction Z and $g_Z$ is the gap between adjacent electrode elements along the transverse direction Z. As such the linear orbiting of the electrode elements 132 to remove the error approximation along the transverse direction Z is greater than or equal to the gap $g_Z$ between adjacent electrode elements along the transverse direction Z. Then, to remove the material of the workpiece between adjacent electrode elements 132 for the error approximation in the vertical direction Y, Equation 6 is utilized.

Figure 14:
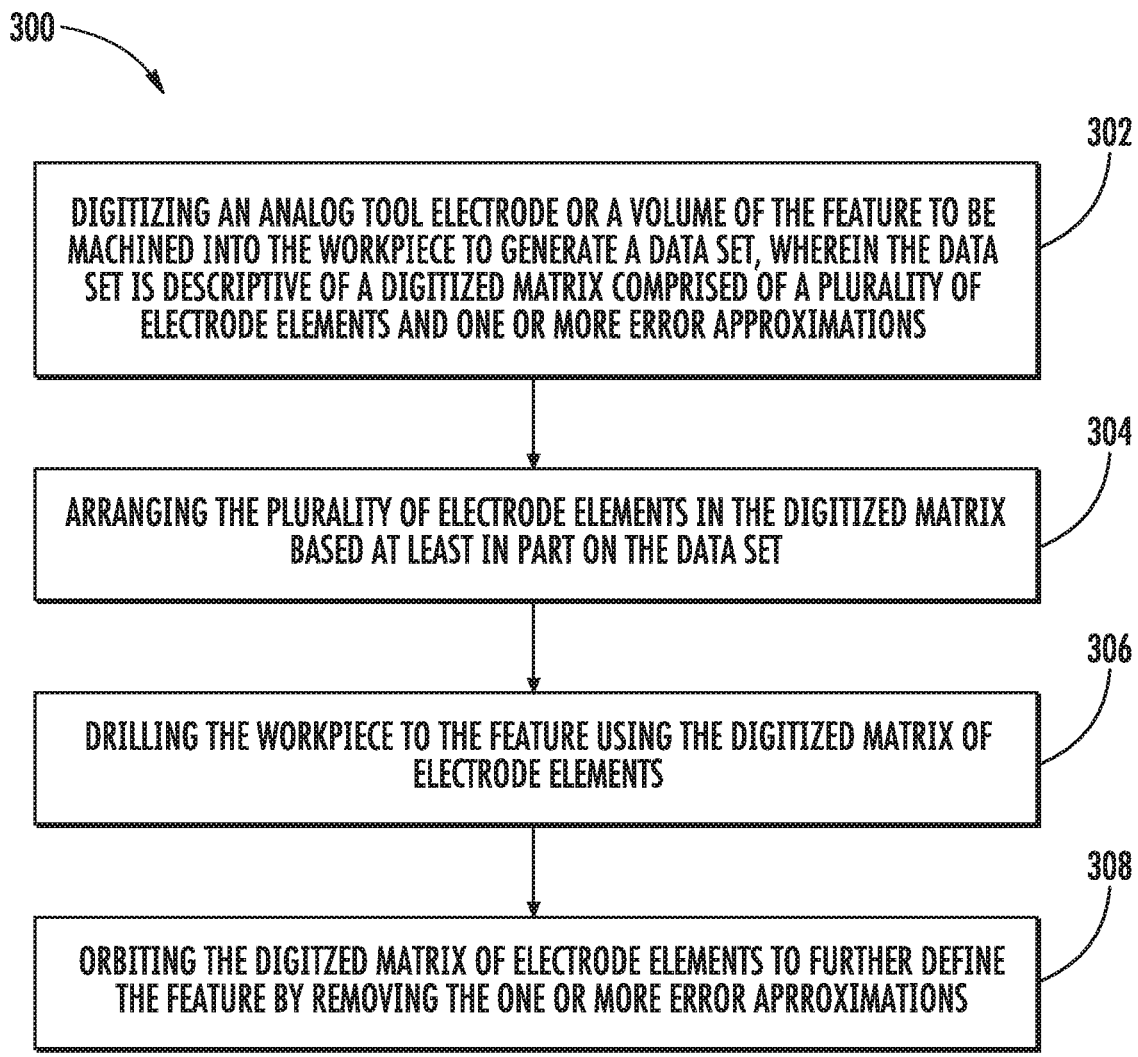
FIG. 14 provides a flow chart for an exemplary method according to an exemplary embodiment of the present disclosure.

FIG. 14 provides a flow diagram of an exemplary method (300) for machining a feature into a workpiece utilizing an EDM system according to exemplary embodiments of the present disclosure. For example, the EDM system can be the EDM system 100 illustrated and described herein.

At (302), the method (200) includes digitizing an analog tool electrode or a volume of the feature to be machined into the workpiece to generate a data set, wherein the data set is descriptive of a digitized matrix comprised of a plurality of electrode elements and one or more error approximations. As one example, digitizing an analog tool electrode includes scanning an analog tool electrode to obtain a 3D rendering of the analog tool electrode. As another example, digitizing a volume of the feature to be machined into the workpiece includes scanning a feature that has already been machined into the workpiece such that a 3D rendering of the volume can be obtained. Thereafter, the 3D rendering data can be input into a controller or other suitable computing device to digitize the analog tool electrode tool or volume. The data set can also be generated from a solid model of the workpiece or electrode. The solid models from computer assisted design (CAD) can generate the digitized data set directly. As an output of digitizing the analog tool electrode, a data set is generated according to the given approximation error. The data set is descriptive of a digitized matrix. That is, for example, the data set is descriptive of an arrangement and spacing of the electrode elements to be arranged in the digitized matrix. The data set is further descriptive of one or more error approximations that may be used to arrange the electrode elements into the matrix (e.g., at (304)) and also as instructions for electrical discharge machining the one or more error approximations (e.g., at (308)). In some implementations, the data set is further descriptive of the number of electrode elements to be positioned within the digitized matrix.

Further, in some implementations, the digitized matrix defines a lateral direction, a transverse direction, and a vertical direction each mutually orthogonal to one another, and wherein the digitized matrix has a tilted parallelogram shape, and wherein the titled parallelogram shape is tilted with respect to the lateral direction by an angle θ, and wherein the one or more error approximations include a lateral error approximation and a vertical error approximation, the lateral error approximation being defined by a gap $g_X$ between adjacent electrode elements along the lateral direction and wherein the vertical error approximation is defined by: $h=d_X*\tan\theta$, where h is the vertical error approximation, $d_X$ is the electrode element size along the lateral direction X.

At (304), the method (200) includes arranging the plurality of electrode elements in the digitized matrix based at least in part on the data set. For example, as shown in FIG. 7, after digitizing the analog electrode tool 220, the plurality of electrode elements 132 are arranged in the digitized matrix 138 based at least in part on the data set.

At (306), the method (200) includes drilling the workpiece to define the feature using the digitized matrix of electrode elements. For instance, as shown in FIG. 3, the tool electrode 130 is advanced proximate the working surface 107 of the workpiece 102 and the plurality of electrode elements 132 discharge sparks 108 to define the feature 104 into the workpiece 102. To drill, the tool electrode 130 is moved along the vertical direction Y and advances to further define the feature 104 as material is removed.

At (308), the method (200) includes orbiting the digitized matrix of electrode elements to further define the feature by removing the one or more error approximations. For instance, as shown in FIG. 3, after drilling (e.g., moving the electrode tool 130 about the vertical direction Y), the tool electrode 130 is orbited about to remove the material defined by the one or more error approximations. For example, the tool electrode 130 can be moved about the lateral direction X, the transverse direction Z, or a combination of the two directions (e.g., about the vertical direction Y). Stated differently, the tool electrode 130 can be laterally orbited or translated or can orbit in a circular, oscillating, or other suitable motion such that the error approximations can be removed.

In some implementations, the plurality of electrode elements each have circular cross sections, and wherein during orbiting, the digitized matrix of electrode elements is moved a distance defined by $a_X \geq 2*g_X+d_X$, where $a_X$ is the orbiting distance of the digitized matrix to remove the error approximation along the lateral direction, $g_X$ is the gap between adjacent electrode elements along the lateral direction X, and $d_X$ is an electrode element size along the lateral direction X, and wherein the digitized matrix of electrode elements is moved a distance defined by $b_Y \geq (2*g_X+d_X)/\cos\theta$, where $b_Y$ is the orbiting distance of the digitized matrix to remove the approximation error along direction Y, $g_X$ is the gap between adjacent electrode elements along the lateral direction, and $d_X$ is the electrode element size along the lateral direction.

In some implementations, the workpiece defines a working surface, and wherein during drilling and orbiting, the workpiece is immersed in a dielectric fluid. In such implementations, the method further includes flushing the dielectric fluid proximate the working surface of the workpiece, wherein a flow of pressurized dielectric fluid is circulated through the plurality of electrode elements to flush the dielectric fluid proximate the working surface.

Although described above with respect to machining a CMC component, it will be appreciated that the electrodes and methods described herein may be used with workpieces comprising other materials, such as metals, alloys, or other composite materials. Further, it should be understood that any suitable dielectric fluid and electrode material may be utilized.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A tool electrode for electrical discharge machining a feature into a workpiece, the tool electrode comprising:
   a plurality of electrode elements arranged in a digitized matrix representative of a tooling shape for machining the feature into the workpiece, wherein the plurality of electrode elements are arranged in the digitized matrix by digitizing an analog electrode tool shaped to machine the feature into the workpiece or a volume of the feature to be machined into the workpiece, and
   wherein the analog tool electrode has a width, and wherein the digitized matrix defines a vertical direction, a lateral direction, and a transverse direction, and wherein the number of electrode elements positioned along the lateral direction is defined by: $n_X=(w-g_X)/(d_X+g_X)$, wherein $n_X$ is the number of electrode elements positioned along the lateral direction, w is the width of the analog tool electrode, $g_X$ is a gap between adjacent electrode elements along the lateral direction, and $d_X$ is an electrode element size along the lateral direction.

2. The tool electrode of claim 1, wherein the analog tool electrode has a length, and wherein the digitized matrix defines a vertical direction, a lateral direction, and a transverse direction, and wherein, during digitizing, the number of electrode elements positioned along the transverse direction is defined by: $n_Z=(L-g_Z)/(d_Z+g_Z)$, wherein $n_Z$ is the number of electrode elements positioned along the transverse direction, L is the length of the analog tool electrode, $g_Z$ is a gap between adjacent electrode elements along the transverse direction, and $d_Z$ is an electrode element size along the transverse direction.

3. The tool electrode of claim 1, wherein each of the plurality of electrode elements are independently powered.

4. The tool electrode of claim 1, further comprising:
   an electrode holder, wherein the plurality of electrode elements are physically ganged together by the electrode holder.

5. The tool electrode of claim 4, wherein the plurality of electrode elements are clamped on the electrode holder by respective clamping springs.

6. The tool electrode of claim 4, wherein each electrode element of the plurality of electrode elements extends between a first end and a second end, and wherein the electrode holder physically gangs the plurality of electrode elements proximate their respective first ends, and wherein the tool electrode further comprises:
an electrode guide, wherein the plurality of electrode elements are physically ganged together by the electrode guide proximate their respective second ends.

7. The tool electrode of claim 6, further comprising:
a surface electrode guide coupled with the electrode guide, wherein the plurality of electrode elements are physically ganged together by the surface electrode guide at their respective second ends.

8. The tool electrode of claim 1, wherein each of the plurality of electrode elements have the same cross section shape and have substantially the same cross sectional area.

9. The tool electrode of claim 1, wherein the workpiece is a ceramic matrix composite (CMC) component, and wherein the tooling shape is a tilted parallelogram configured to machine a seal slot into the CMC component.

10. An EDM system for machining a feature into a workpiece, the EDM system defining a vertical direction, a lateral direction, and a transverse direction each mutually orthogonal to one another, the EDM system comprising:
a tank defining a volume for holding the workpiece within a dielectric fluid;
a tool electrode selectively movable to machine the feature into the workpiece and comprising a plurality of electrode elements spaced apart from one another and arranged in a digitized matrix representative of a tooling shape for machining the feature into the workpiece, wherein the plurality of electrode elements are spaced apart from one another and arranged in the digitized matrix by digitizing an analog electrode tool configured to machine the feature into the workpiece or a volume of the feature to be machined into the workpiece, and
wherein the analog tool electrode has a width, and wherein the digitized matrix defines a vertical direction, a lateral direction, and a transverse direction, and wherein the number of electrode elements positioned along the lateral direction is defined by: $n_X=(w-g_X)/(d_X+g_X)$, wherein $n_X$ is the number of electrode elements positioned along the lateral direction, w is the width of the analog tool electrode, $g_X$ is a gap between adjacent electrode elements along the lateral direction, and $d_X$ is an electrode element size along the lateral direction.

11. The EDM system of claim 10, wherein the plurality of electrode elements are a plurality of electrode tubes, and wherein each of the plurality of electrode tubes independently flush the dielectric fluid proximate a working surface of the workpiece when machining the feature into the workpiece.

12. The EDM system of claim 10, wherein the plurality of electrode elements are a plurality of electrode tubes, and wherein the workpiece defines a working surface, and wherein the EDM system further comprises:
a manifold configured to receive a flow of pressurized dielectric fluid and defining a main channel and a plurality of discrete channels fluidly connected with the main channel, wherein each of the plurality of electrode tubes are fluidly connected with one of the plurality of discrete channels;
wherein each of the plurality of electrode tubes define a through hole extending between a tube inlet and a tube outlet, wherein each of the plurality of electrode tubes are fluidly connected with one of the plurality of discrete channels at their respective tube inlets and the pressurized dielectric fluid exits the electrode tubes proximate their respective tube outlets proximate the working surface of the workpiece.

13. The EDM system of claim 12, each of the plurality of electrode tubes are fluidly connected with one of the plurality of discrete channels by a corresponding micro fitting, wherein each of the micro fittings selectively allow the flow of pressurized dielectric fluid into their respective electrode tubes.

14. The EDM system of claim 10, wherein the workpiece defines a working surface, and wherein each of the plurality of electrode elements extend between a first end and a second end, and wherein the electrode tool further comprises:
an electrode holder configured to physically gang together the plurality of electrode elements proximate their respective first ends;
an electrode guide configured to physically gang together the plurality of electrode elements proximate their respective second ends; and
a surface electrode guide configured to physically gang together the plurality of electrode elements at their respective second ends.

15. A tool electrode for electrical discharge machining a feature into a workpiece, the tool electrode comprising:
a plurality of electrode elements arranged in a digitized matrix representative of a tooling shape for machining the feature into the workpiece, wherein the plurality of electrode elements are arranged in the digitized matrix by digitizing an analog electrode tool shaped to machine the feature into the workpiece or a volume of the feature to be machined into the workpiece, and
wherein the analog tool electrode has a length, and wherein the digitized matrix defines a vertical direction, a lateral direction, and a transverse direction, and wherein the number of electrode elements positioned along the transverse direction is defined by: $n_Z=(L-g_Z)/(d_Z+g_Z)$, wherein $n_Z$ is the number of electrode elements positioned along the transverse direction, L is the length of the analog tool electrode, $g_Z$ is a gap between adjacent electrode elements along the transverse direction, and $d_Z$ is an electrode element size along the transverse direction.

16. The tool electrode of claim 15, wherein the analog tool electrode has a width, and wherein the number of electrode elements positioned along the lateral direction is defined by: $n_X=(w-g_X)/(d_X+g_X)$, wherein $n_X$ is the number of electrode elements positioned along the lateral direction, w is the width of the analog tool electrode, $g_X$ is a gap between adjacent electrode elements along the lateral direction, and $d_X$ is an electrode element size along the lateral direction.

17. The tool electrode of claim 15, wherein each one of the plurality of electrode elements is independently powered.

18. The tool electrode of claim 15, further comprising:
an electrode holder, wherein the plurality of electrode elements are physically ganged together by the electrode holder.

19. The tool electrode of claim 18, wherein the plurality of electrode elements are clamped on the electrode holder by respective clamping springs.

* * * * *